US012462716B2

(12) United States Patent
Thompson

(10) Patent No.: US 12,462,716 B2
(45) Date of Patent: Nov. 4, 2025

(54) PORTABLE DISPLAY SYSTEM FOR LIGHTWEIGHT ARTWORK

(71) Applicant: Calibe Thompson, Fort Lauderdale, FL (US)

(72) Inventor: Calibe Thompson, Fort Lauderdale, FL (US)

( * ) Notice: Subject to any disclaimer, the term of this patent is extended or adjusted under 35 U.S.C. 154(b) by 204 days.

(21) Appl. No.: 18/343,439

(22) Filed: Jun. 28, 2023

(65) Prior Publication Data

US 2023/0419869 A1 Dec. 28, 2023

Related U.S. Application Data

(60) Provisional application No. 63/367,144, filed on Jun. 28, 2022.

(51) Int. Cl.
*G09F 15/00* (2006.01)

(52) U.S. Cl.
CPC .. *G09F 15/0068* (2013.01); *G09F 2015/0093* (2013.01)

(58) Field of Classification Search
CPC ..................... G09F 15/0068; G09F 2015/0093
See application file for complete search history.

(56) References Cited

U.S. PATENT DOCUMENTS

| | | | | |
|---|---|---|---|---|
| 5,613,314 A * | 3/1997 | Leverenz | G09F 15/00 | 160/207 |
| 9,633,585 B1 * | 4/2017 | Hanes | G09F 15/0012 | |
| 10,672,306 B1 * | 6/2020 | Whidden | G09F 15/0068 | |
| 10,743,680 B1 * | 8/2020 | Weis | A47F 5/14 | |
| 10,973,325 B1 * | 4/2021 | Morgan | A47B 96/04 | |
| 11,561,072 B1 * | 1/2023 | Larsen | G09F 15/0068 | |
| 2003/0038829 A1 * | 2/2003 | McMillan | G09F 15/0068 | 715/700 |
| 2012/0110788 A1 * | 5/2012 | Chen | E04F 13/0817 | 29/428 |
| 2012/0216437 A1 * | 8/2012 | Ahlberg | G09F 15/0068 | 40/603 |
| 2014/0197123 A1 * | 7/2014 | McPhillips | G09F 15/00 | 211/195 |
| 2015/0282359 A1 * | 10/2015 | Raccah | G09F 15/0068 | 40/741 |
| 2017/0236460 A1 * | 8/2017 | Cook | G09F 15/0025 | 40/603 |
| 2021/0183280 A1 * | 6/2021 | Apostle | G09F 15/0068 | |
| 2021/0217333 A1 * | 7/2021 | Swenson | G09F 17/00 | |

* cited by examiner

*Primary Examiner* — Gary C Hoge
(74) *Attorney, Agent, or Firm* — Bennett Intellectual Property; Allen F. Bennett; Kaela Stephano

(57) ABSTRACT

A portable display system for lightweight artwork comprising: a collapsible frame comprising an elongate base member having two ends, two elongate vertical members, one extending from each of the two ends of the elongate base member, an elongate top crossbar member extending between the two elongate vertical members. A plurality of legs extend downward from each end of the elongate base member, and one or more tensile cables extend horizontally between the two elongate vertical members. At least one item of lightweight artwork is removably attached to the one or more tensile cables, and all elongate members of the collapsible frame telescopically extend and retract.

18 Claims, 15 Drawing Sheets

PORTABLE DISPLAY SYSTEM FOR LIGHTWEIGHT ARTWORK

CROSS-REFERENCE TO RELATED APPLICATIONS

This application claims priority to U.S. Provisional Application Ser. No. 63/367,144 filed on Jul. 7, 2022, the contents of which are hereby incorporated in their entirety.

STATEMENT REGARDING FEDERALLY SPONSORED RESEARCH OR DEVELOPMENT

Not Applicable.

NAMES OF PARTIES TO A JOINT RESEARCH AGREEMENT

Not Applicable

REFERENCE TO SEQUENCE LISTING, A TABLE, OR A COMPUTER PROGRAM LISTING APPENDIX SUBMITTED ON A COMPACT DISC AND INCORPORATION-BY-REFERENCE OF THE MATERIAL

Not Applicable.

COPYRIGHT NOTICE

Not Applicable.

BACKGROUND OF THE INVENTION

Field of the Invention

The present invention relates to a portable display system for lightweight artwork. More particularly, the invention relates to a specifically designed display system for lightweight artwork that is portable, collapsible, lightweight, and sturdy, due to a plurality of legs mounted onto the collapsible frame. The invention is particularly useful at weekend art fairs and other temporary visual displays at schools, exhibitions, and conferences, to allow artists to efficiently setup and show their artwork, without having to worry about the display being unstable or unnecessarily heavy.

Description of the Related Art

Several devices exist in the prior art which are designed to display artwork, advertisements, pictures, and exhibits. These devices are limited in that they are often meant to be permanently installed and they are heavy and/or bulky. This would pose a problem for short-term art shows or fairs because artists may not be able to permanently install an apparatus, or they may not be strong enough to carry a large, rigid display system. To be useful at an art fair or exhibition, a display device should be portable, easily installed and removed, sturdy, and able to accommodate multiple display articles at one time. Additionally, the device should allow for as many or as few display articles to be hung, and for art to be vertically or horizontally hung, depending on its width or height.

The above-described deficiencies of today's systems are merely intended to provide an overview of some of the problems of conventional systems, and are not intended to be exhaustive. Other problems with the state of the art and corresponding benefits of some of the various non-limiting embodiments may become further apparent upon review of the following detailed description.

In view of the foregoing, it is desirable to provide a display system for lightweight artwork that is portable, collapsible, lightweight, and sturdy.

BRIEF SUMMARY OF THE INVENTION

Disclosed is a portable display system for lightweight artwork comprising: a collapsible frame comprising an elongate base member having two ends, two elongate vertical members, one extending from each of the two ends of the elongate base member, and an elongate top crossbar member extending between the two elongate vertical members. A plurality of legs extend downward from each end of the elongate base member, and one or more tensile cables extend horizontally between the two elongate vertical members. At least item of lightweight artwork is removably attached to the one or more tensile cables, and all elongate members of the collapsible frame telescopically extend and retract.

In one embodiment, all elongate members of the collapsible frame have a circular cross-section, and each of the plurality of legs extending downward from the two ends of the elongate base member are each connected to one of the two elongate vertical members. The tensile cables extend between two clamps and one of the clamps includes a retractable reel providing tension to one of the one or more tensile cables. Each of the two clamps includes a flexible belt and slot having a locking mechanism opposite to the belt.

Hanging clips may be used to hang the lightweight artwork. The hanging clips may be comprised of a front disc and a back disc connected by a hinge, a hook on the outside surface of the front disc, horizontal openings on the left side and the right side of the front disc and back disc, vertical openings on a top side and a bottom side of the front disc and back disc, and four pressure fit snap locks radially spaced about the center of the back disc on the inside surface of the back disc. The one or more tensile cables are held inside the pressure fit snap locks on the inside surface of the back disc to hold the hanging clips in a fixed vertical position and a fixed horizontal position on the one or more tensile cables. The lightweight artwork may also be hung by magnetic butterfly clips.

In another embodiment, a plurality of legs extend downward and are connected to each end of the elongate base member, and all elongate members of the collapsible frame have a square cross-section. The elongate members include a plurality of circular openings on the inside surface, and fasteners may be removably secured into the openings. The tensile cables have firm loops on the ends that may be attached to the fasteners.

In another embodiment, the elongate members includes circular openings on the front surface, and fasteners may be removably secured into the openings.

In another embodiment, a top side of the elongate base member and a bottom side of the elongate top crossbar member includes one or more permanent fasteners.

It is therefore an object of the present invention to provide a portable display system for lightweight artwork comprising a collapsible frame and mounting system having a plurality of legs for the collapsible frame.

These and other objects and advantages of the present invention will become apparent from a reading of the attached specification and appended claims. There has thus been outlined, rather broadly, the more important features of the invention in order that the detailed description thereof that follows may be better understood, and in order that the present contribution to the art may be better appreciated. There are features of the invention that will be described hereinafter and which will form the subject matter of the claims appended hereto.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
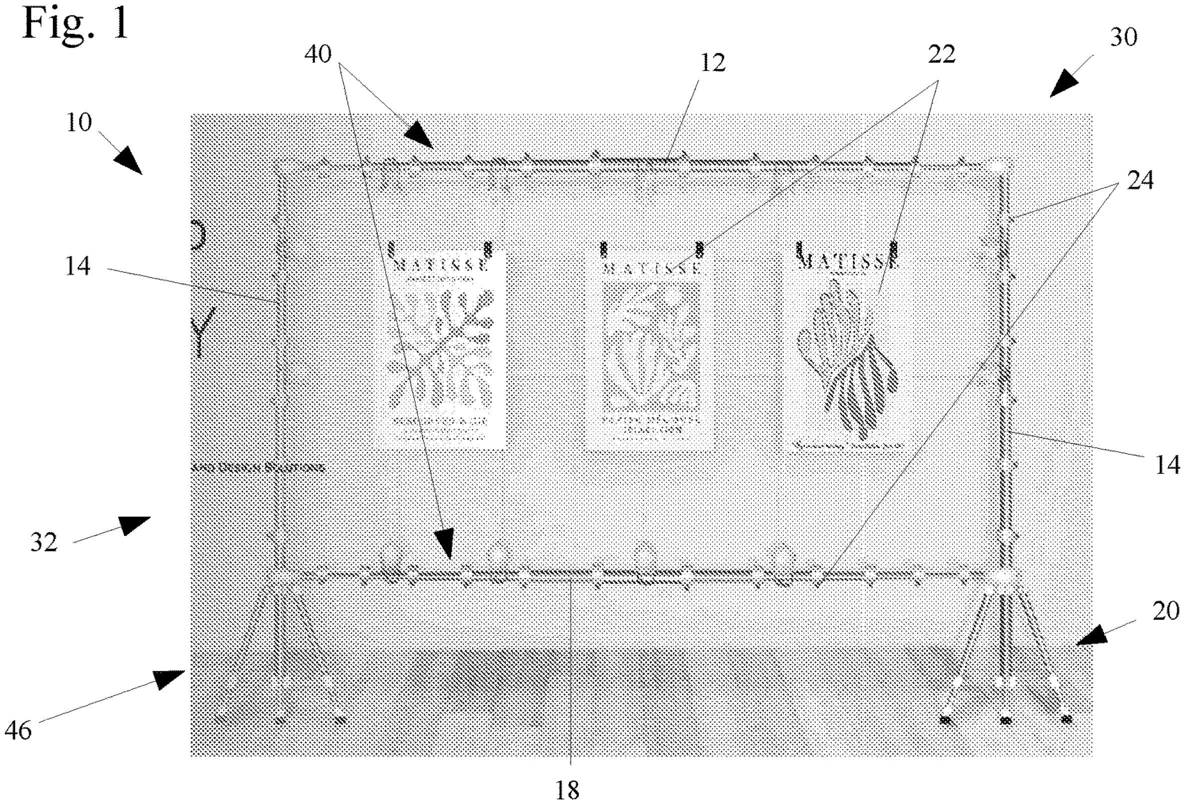
FIG. 1 is a front elevation view of a portable display system for lightweight artwork in accordance with the principles of the invention.

The invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter may be practiced without these specific details. In other instances, well-known structures and devices are shown in block diagram form in order to facilitate describing the various embodiments herein.

Unless otherwise indicated, all numbers expressing quantities of ingredients, dimensions, reaction conditions and so forth used in the specification and claims are to be understood as being modified in all instances by the term “about”. The term “a” or “an” as used herein means “at least one” unless specified otherwise. In this specification and the claims, the use of the singular includes the plural unless specifically stated otherwise. In addition, use of “or” means “and/or” unless stated otherwise. Moreover, the use of the term “including”, as well as other forms, such as “includes” and “included”, is not limiting. Also, terms such as “element” or “component” encompass both elements and components comprising one unit and elements and components that comprise more than one unit unless specifically stated otherwise.

Various embodiments of the disclosure could also include permutations of the various elements recited in the claims as if each dependent claim was a multiple dependent claim incorporating the limitations of each of the preceding dependent claims as well as the independent claims. That is, the combinations of the various components of the invention are not limited to those combinations expressly shown in the Figures. Unless expressly stated otherwise, components described in one embodiment may be interchanged with components of the same name found in other embodiments. Such permutations are expressly within the scope of this disclosure.

Disclosed is a portable display system for lightweight artwork comprising: a collapsible frame comprising an elongate base member having two ends, two elongate vertical members, one extending from each of the two ends of the elongate base member, and an elongate top crossbar member extending between the two elongate vertical members. A plurality of legs extend downward from each end of the elongate base member, and one or more tensile cables extend horizontally between the two elongate vertical members. At least one item of lightweight artwork is removably attached to the one or more tensile cables, and all elongate members of the collapsible frame telescopically extend and retract.

FIGS. 1-13 show a portable display system 10 for lightweight artwork 22, in accordance with the principles of the invention. The extendible and collapsible frame 30 of the display system 10 is formed from an elongate base member 18, an elongate top crossbar member 12, and two elongate vertical members 14. In this embodiment, the elongate members 12, 14, and 18 of the frame 30 are formed from several individual units of telescopically collapsing round tubing. The telescopic mechanism is useful for the case where one of the elongate members breaks. The user would be able to replace the member with a standard rod or an elongate piece of wood and adjust the remainder of the members to the length of the replacement rod. The members may also have a rectangular, square, octagonal, triangular, or any other cross section as desired. Additionally, some or all of the elongate members may be a set length and may not telescopically extend or retract. The two elongate vertical members 14 are preferably coextensive when the frame 30 is assembled 32, run parallel to and on opposing sides of the frame 30. The elongate top crossbar member 12 and the elongate base member 18 are similarly coextensive, and similarly composed of a plurality of individual telescoping units. When the frame 30 is assembled 32, the base and top crossbar members 18 and 12 extend between and perpendicular to the two elongate vertical members 14. Thus, in this embodiment the frame is rectangular when fully assembled.

Figure 2:
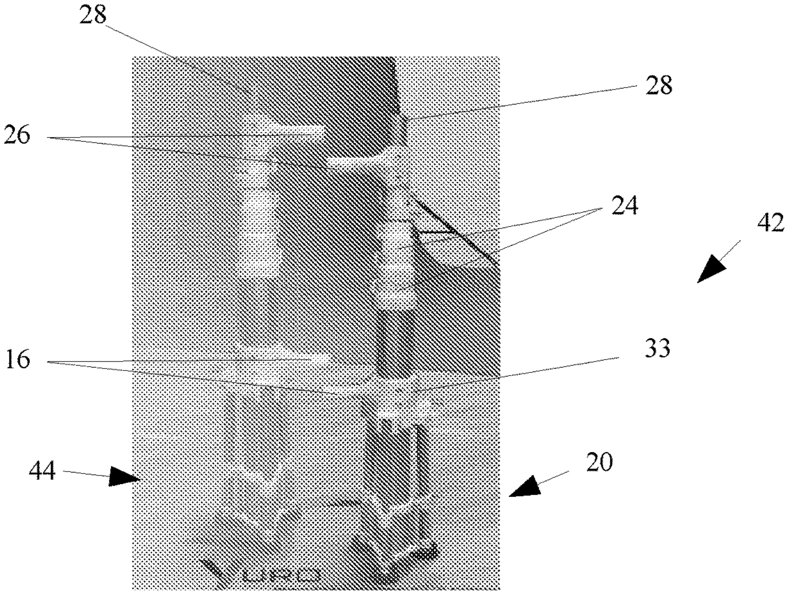
FIG. 2 is a perspective view of the two vertical members of a portable display system for lightweight artwork with the pair of tripods attached, in accordance with the principles of the invention.

As shown in FIG. 2, the two elongate vertical members 14 each include a lower link 16 and an upper link 26, to which the elongate base member 18 and the elongate top crossbar member 12 are removably affixed to form the frame 30. In this embodiment, the upper link 26 is located at the top 28 of each of the elongate vertical members 14, and the lower link 16 is located at the base 33 of each of the elongate vertical members 14. In this embodiment, the upper and lower links 26 and 16 extend from the same side of elongate vertical members 14, and the upper link 26 is coplanar to the lower link 16. Optionally, the upper and/or lower links may be located towards the center of each of the elongate vertical members, or an additional link or links may be included to support another member if desired. The elongate vertical members 14 include a plurality of legs 20 extending downward from the base 33. The legs 20 are explained in more detail in FIG. 5. The elongate vertical members 14 further include multiple quick release flip locks 24 to extend and compress the individual telescoping units of the elongate vertical members 14. In this embodiment, there are six quick release flip locks 24 on each of the vertical members 14. Optionally, any number of flip locks may be included on the vertical members to telescopically extend and retract the vertical member. The flip locks 24 are explained in more detail in FIG. 7.

Figure 3:
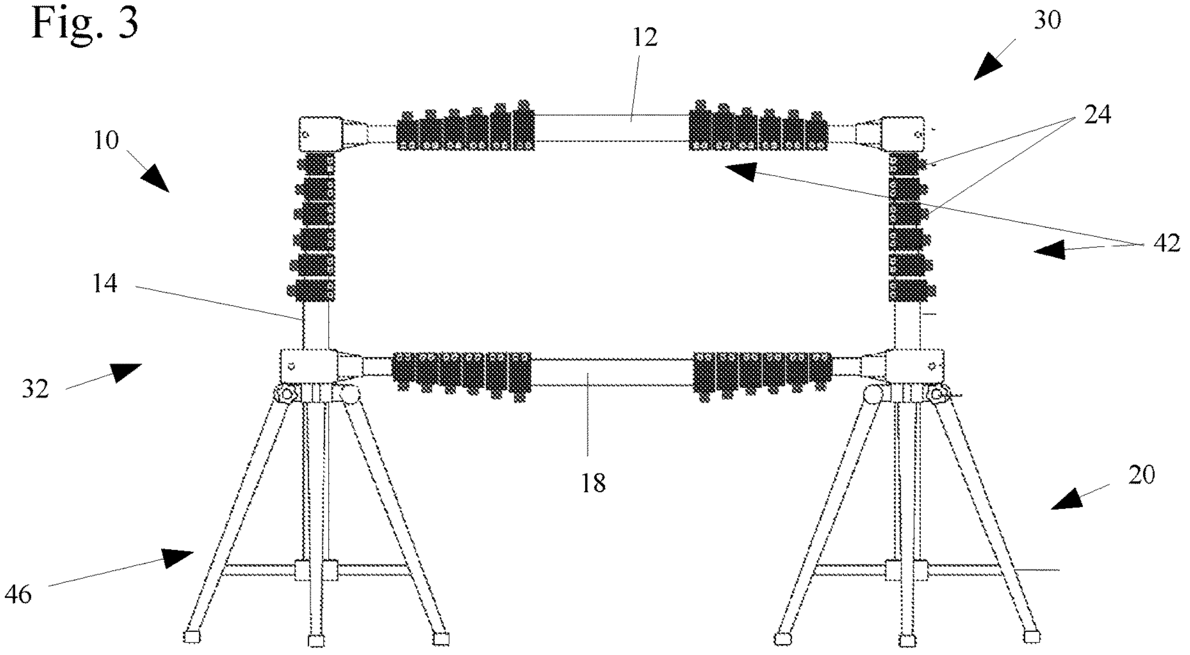
FIG. 3 is a front elevation view of the portable display system for lightweight artwork in the assembled position with all the members in the compact position, in accordance with the principles of the invention.
Figure 4:
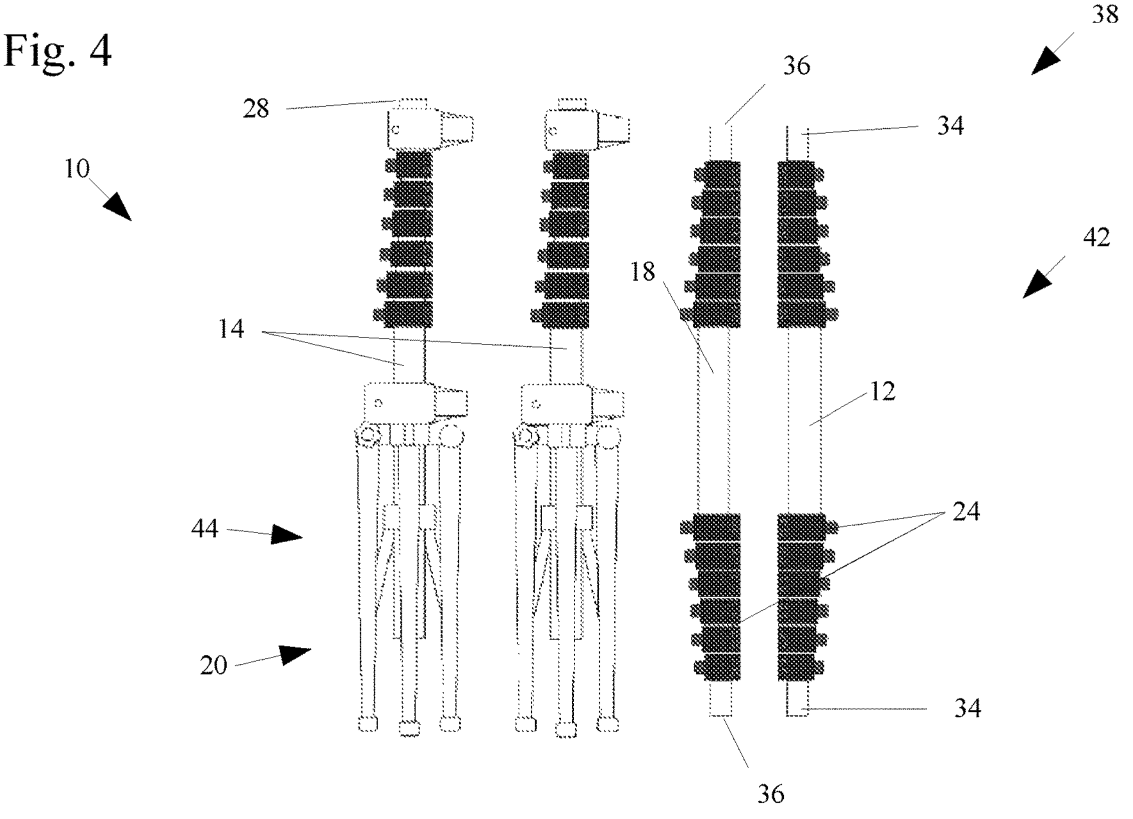
FIG. 4 is a front elevation view of the members of the portable display system for lightweight artwork in the disassembled position with all the members in the compact position, in accordance with the principles of the invention.

As shown in FIGS. 3 and 4, the elongate top crossbar member 12 and the elongate base member 18 include multiple quick release flip locks 24 to adjust and lock the individual telescoping units of the members 12 and 18. In this embodiment, the elongate top crossbar member 12 and the elongate base member 18 have a set of six quick release flip locks 24 corresponding to six telescoping members, and the members 12 and 18 each taper towards each of their respective ends 34 and 36. Optionally, the quick release flip locks may be included only on one end of the member, and any number of flip locks may be included on both of the members 12 and 18.

Figure 5:
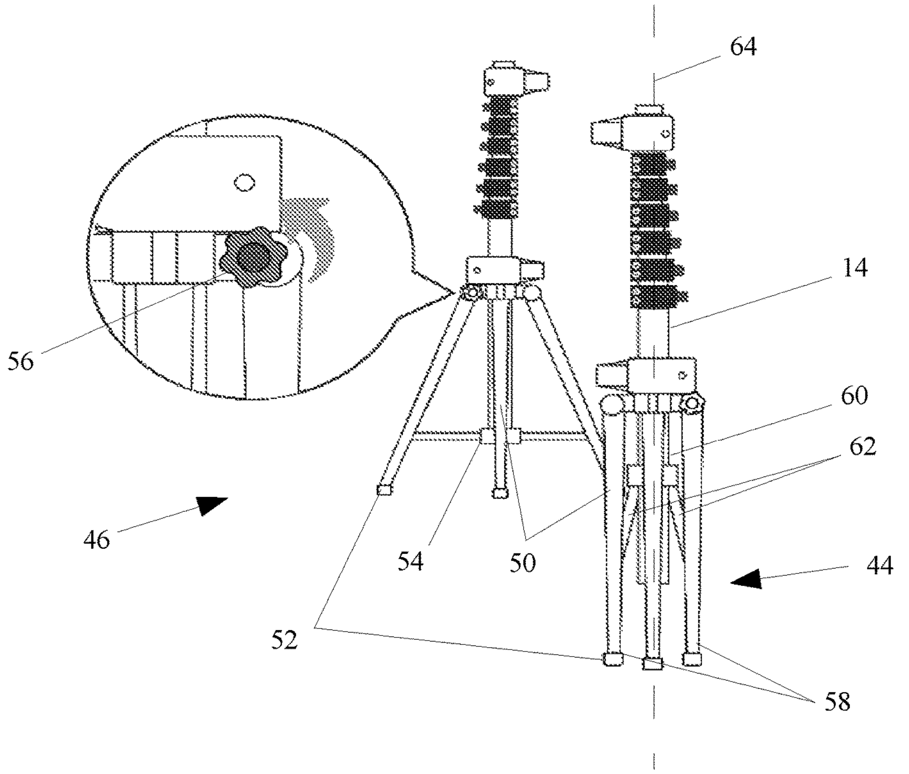
FIG. 5 is an enlarged view of the dial for the plurality of legs of the portable display system for lightweight artwork in accordance with the principles of the invention.

The plurality of legs 20 are shown in more detail in FIG. 5. In this embodiment, the plurality of legs 20 are comprised of three supports 50 and are in the configuration of a tripod. Optionally, the plurality of legs 20 may be comprised of as little as two supports, extending in front of and behind the frame, or three, four, or more supports as desired. Each support 50 has a rubber pad 52 on the end 58, which is in contact with the floor or surface on which the display 10 is mounted, and the supports 50 are connected by an angle adjuster 54. The angle adjuster 54 is slidably attached to a central pole 60, and the angle adjuster 54 is connected to each of the supports 50 by a brace 62. The angle adjuster 54 is controlled by a dial 56. In this embodiment, to translate the plurality of legs 20 from the disengaged position 44 to the engaged position 46, the dial 56 is turned clockwise to release tension and allow the angle adjustment 54 to slide down the central pole 60. This applies outward pressure to the supports 50 by the braces 62 and forces the end 58 of the supports 50 to rotatably extend past the central axis 64 of the vertical member 14 and into the engaged position 46. Once the supports 50 are in the engaged position 46, the dial 56 is turned counterclockwise to lock the plurality of legs 20 in the engaged position 46. Those skilled in the art will appreciate that this configuration corresponds to a typical tripod. To translate the plurality of legs 20 from the engaged position 46 to the disengaged position 44, the dial 56 is turned clockwise to unlock the plurality of legs 20, allowing the angle adjustment 54 to slide up the central pole 60. The user must apply an upward pulling force to the braces 62 by the angle adjustment 54 rotating the end 58 of each support 50 back to the disengaged position 44 in which the supports 50 are parallel to the central axis 64 of the elongated vertical member 14. Once the supports 50 are in the disengaged position 44, the dial 56 is turned counterclockwise to lock the plurality of legs 20 in the disengaged position 44. Those skilled in the art would appreciate that the rotational direction of dial is not limiting, and that the dial may instead be spun counterclockwise to unlock so the user may translate the plurality of legs to the engaged or disengaged position, and clockwise to lock the plurality of legs into position.

Figure 7:
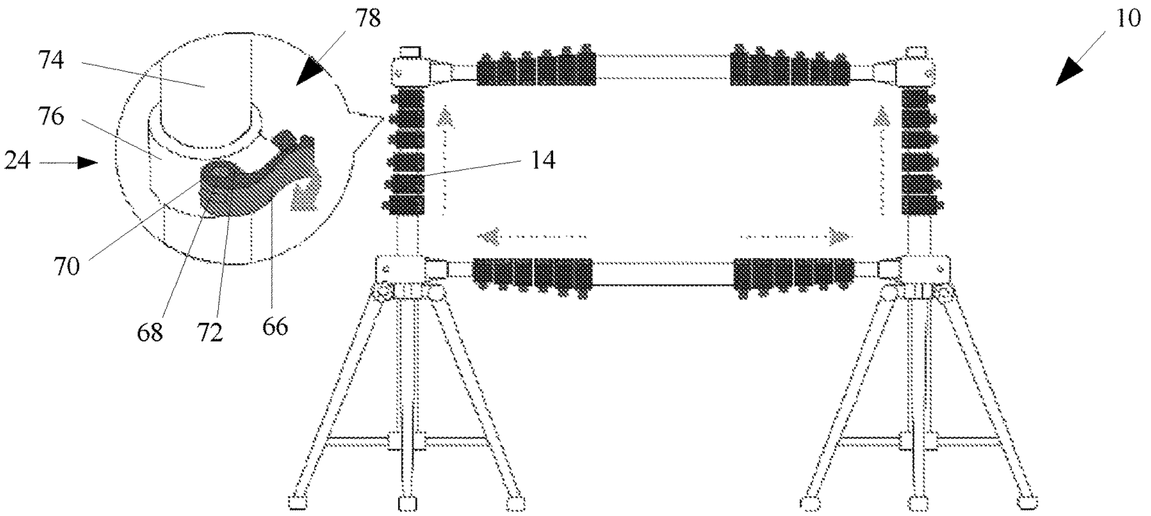
FIG. 7 is an enlarged view of the flip lock of the vertical members of the portable display system for lightweight artwork in accordance with the principles of the invention.

The quick release flip locks 24 are shown in more detail in FIG. 7. As shown herein, the quick release flip lock 24 is integrated into each of the individual units of each of the elongate vertical members 14. The quick release flip lock 24 consists of a cuff 76, a lever 66, and a pin 68. The end of the lever 66 rotatably connected to the pin 68 is comprised of two sections: the first having a smaller radius 70 and the second having a larger radius 72. In the locked position 78, the section with the larger radius 72 is against the cuff 76, applying pressure to the cuff 76. When the lever 66 is rotated clockwise, about the pin 68, the end of the lever 66 is turned causing the section with the smaller radius 70 to rest against the cuff 76. This releases the pressure applied to the cuff 76. Each quick release flip lock 24 on the elongate vertical member 14 designates an inner tube 74 of the member 14. To operate the quick release flip lock 24, release the inner tube 74, and extend the length of the vertical member 14, the lever 66 is rotated counterclockwise, relative to the pin 68. This turns the end of the lever 66 connected to the pin 68 and causes the section with the smaller radius 70 to be released from the cuff 76. This releases the pressure applied to the cuff 76 and allows the inner tube 74 to slide freely. Though this is demonstrated on only one of the vertical members 14, those having ordinary skill in the art would appreciate that this concept also applies to each quick release flip lock 24 on each member 12, 14 and 18 of the portable display system 10.

Figure 9:
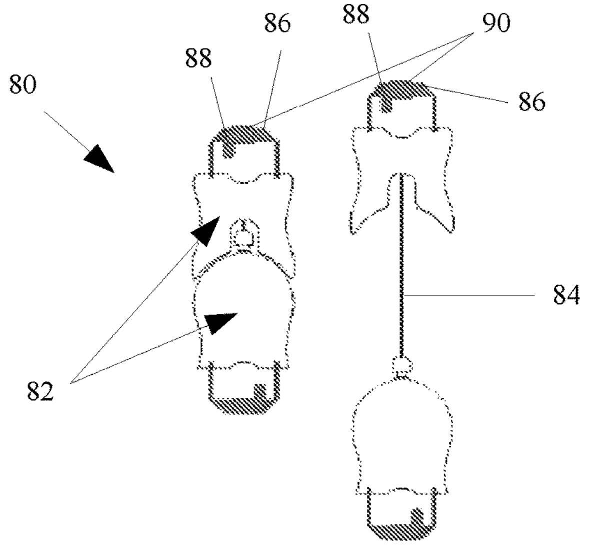
FIG. 9 is a front elevation view of the retractable cable reel of the portable display system for lightweight artwork in accordance with the principles of the invention.

FIG. 9 shows a front view of the retractable cable reel 50 used to hang lightweight artwork 22 from the frame 30 of the portable display system 10. In the embodiment, the retractable cable reel consists of two clamps 82 that are connected with a single tensile cable 84. Each clamp 82 has a first belt 86 connected to a buckle 90 and a second belt 88, to attach and secure the retractable cable reel 50 to the elongate members 12, 14, and 18 of the frame 30. The first and second belts may be formed from fabric, leather, rubber, or the like. In this embodiment, only one of the two clamps 82 has an integrated internal retractable cable mechanism. However, this should not be considered limiting as both clamps may include a retracting mechanism. Furthermore, though a retractable cable mechanism is used in this embodiment, one or both of the clamps 82 may include an integrated ratchet locking system or other alternative means of adjusting the length of the cable and adjusting its tension.

The retractable cable reel 80 can be strung both horizontally between the two vertical elongate members 14 and vertically between the elongated top crossbar member 12 and the base member 18, as in FIGS. 1, 8, 12, and 13. To attach, the second belt 88 of one of the clamps 82 is looped around one of the elongate members 12, 14, and 18 and pulled through the buckle 90 attached to the first belt 86. The second belt 88 is then pulled tight to secure and lock one of the clamps 82 in place. Once one of the clamps 82 is secured to one of the elongate members 12, 14, and 18, the other clamp 82 is pulled in a direction opposite to the first clamp 82, which has been secured onto one of the elongate members 12, 14, and 18. This allows the tensile cable 84 to unwind from inside the clamp 82. Once the clamp 82 has reached the member 12, 14, and 18 on the opposing side of the frame 30, the second belt 88 of the other clamp 82 is looped around the opposing elongate member 12, 14, and 18 and pulled through the buckle 90 attached to the first belt 86 of the other clamp 82. The belt and buckle provide an advantage to other hanging methods because the inner tubes of each member have different circumferences. Since the second belt can be pulled through the buckle as little or as much as possible, the user can ensure that the clamps of the retractable cable reel are securely fastened to each of the members.

To remove the retractable cable reel 80 from the frame 30, second belt 88 is released from the buckle 90 and the free clamp 82 is moved towards the secured clamp 82, which retracts and rewinds the tensile cable 84 back into the clamp 82. Once one of the clamps 82 has reached the clamp 82 attached to one of the members 12, 14, and 18, the second belt 88 is released from the buckle 90 and the retractable cable reel 80 is removed from the portable display system 10.

Figure 10:
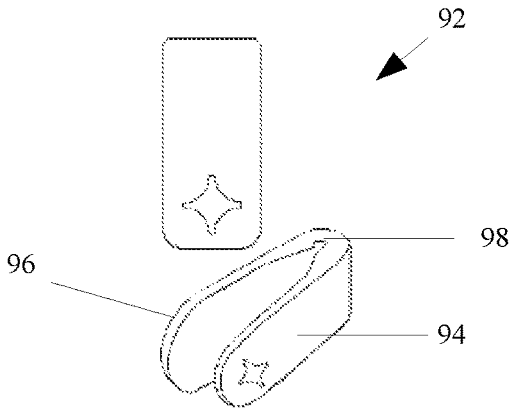
FIG. 10 is a perspective view of the magnetic clip of the portable display system for lightweight artwork in accordance with the principles of the invention.

FIG. 10 shows a front view of the butterfly clips 92 used to hang lightweight artwork 22 from the tensile cables 84 of the portable display system 10. The butterfly clips 92 have two ends 94 and 96 that touch when the clip 92 is closed and slot 98 for the tensile cable 84 to rest. The inside surface of one end 94 of the butterfly clips 92 contains a positive magnetic charge and the inside surface of the other end 96 contains a negative charge. This allows the butterfly clip 92 to removably attach lightweight artwork 22 to the tensile cables 84 of the portable display system 10.

Figure 11:
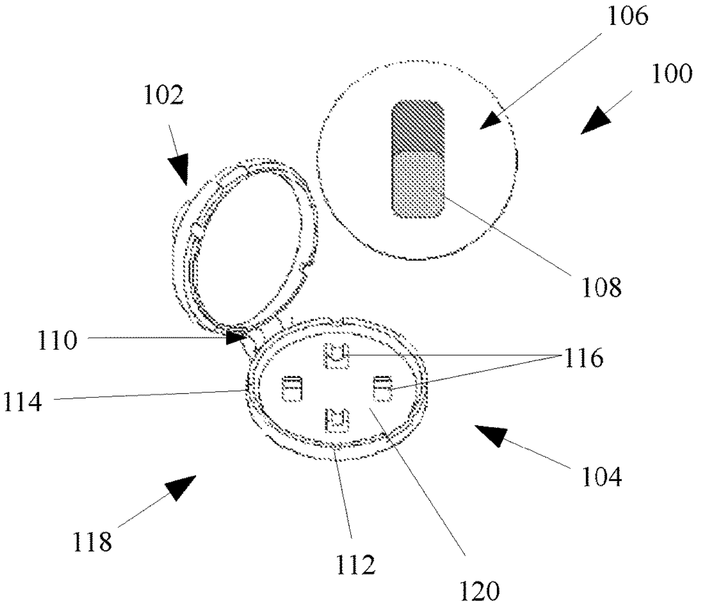
FIG. 11 is a perspective view of the hanging clip of the portable display system for lightweight artwork in accordance with the principles of the invention.

FIG. 11 shows the hanging clip 100 used to hang lightweight artwork 22 from the tensile cables 84 of the portable display system 10. As shown, the hanging clip 100 consists of a front disc 102 having a hook 108 on the outside surface 106, a back disc 104, a hinge 110, four pressure fit snap locks 116 on the inside surface 120 of the back disc 104 and radially spaced about the center of the back disc 104, horizontal openings 114 on the left and right of the hanging clip 100 aligned with the two pressure fit snap locks 116 on the left and right, and vertical openings 112 on the top and bottom of the hanging clip 100 aligned with the two pressure fit snap locks 116 on the top and bottom.

Figure 6:
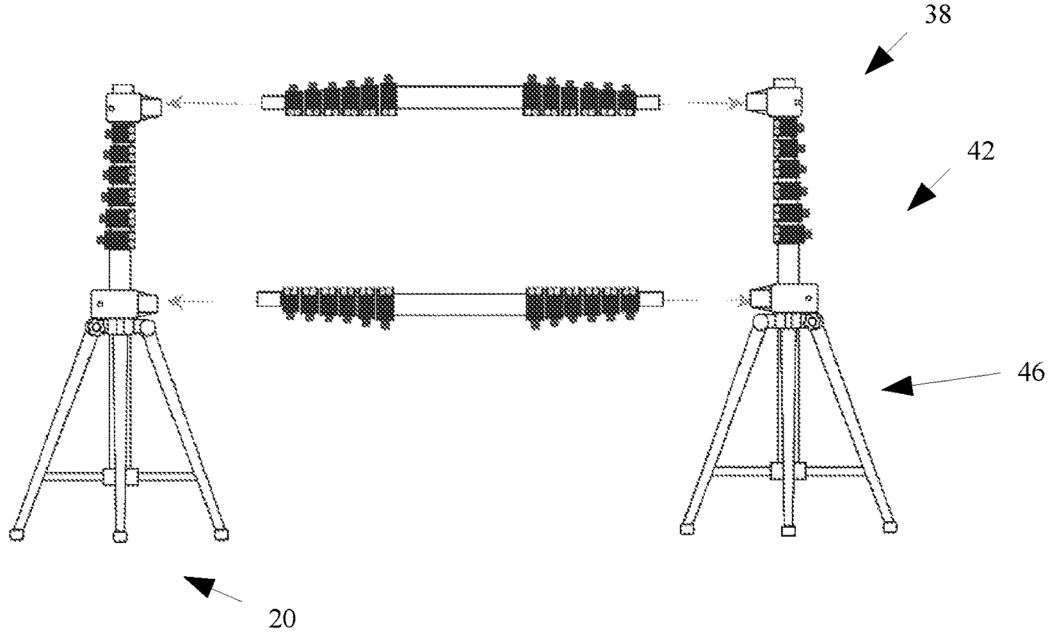
FIG. 6 is a front elevation view of the assembling process for the portable display system for lightweight artwork, in accordance with the principles of the invention.
Figure 8:
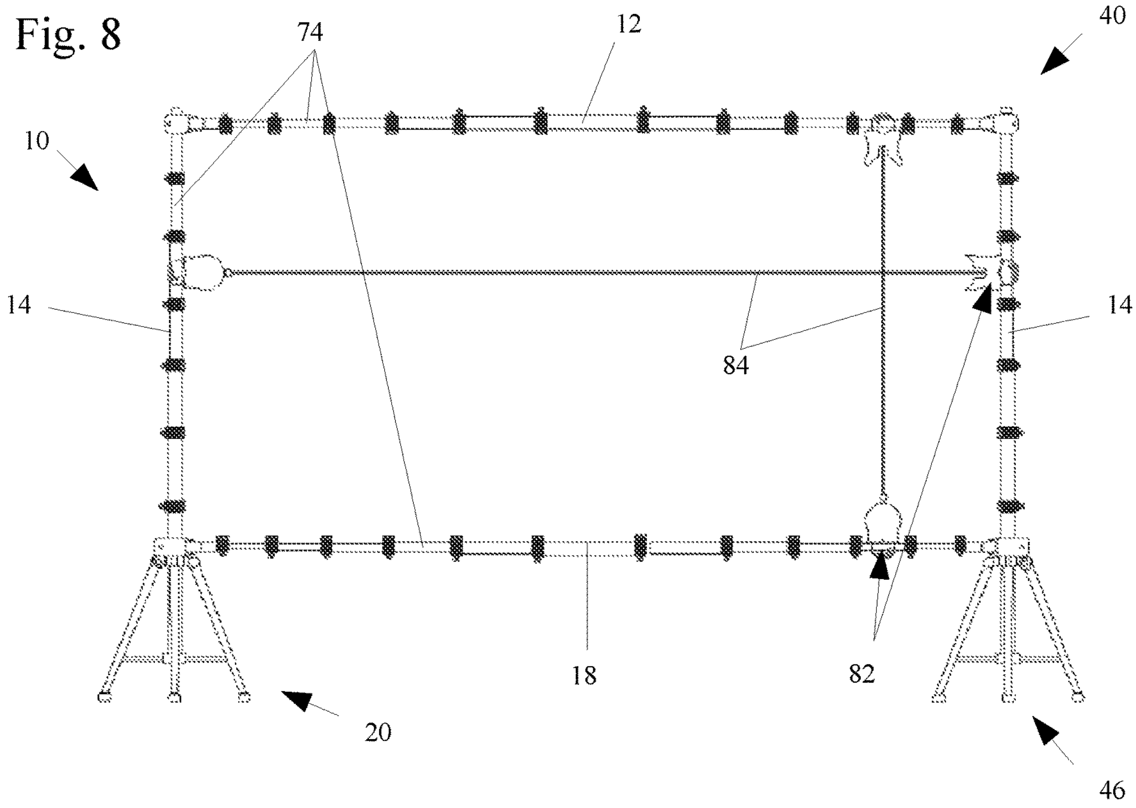
FIG. 8 is a front elevation view of the portable display system for lightweight artwork in the assembled position with all the members in the extended position, in accordance with the principles of the invention.

All elongate members 12, 14, and 18 of the frame 30 are easily assembled, disassembled, compressible, and extendable. This allows the display system 10 to be lightweight, portable, and reconfigured for a number of events, or to showcase a plurality of differing items. This is demonstrated in FIGS. 1-8. In FIGS. 2 and 4, the frame 30 of the display system 10 is disassembled 38, and all elongate members 12, 14, and 18 are compressed 42. The plurality of legs 20 are disengaged 44 and are also in their most condensed form. FIG. 6 shows the process of assembling the frame 30. The ends 34 of the elongated top crossbar member 12 are secured onto the upper links 26 of the elongated vertical members 14, and the ends 36 of the elongated base member 18 are secured onto the lower links 16 of the elongated vertical members 14. The dial 56 is also rotated clockwise to loosen the plurality of legs 20 to allow the legs 20 to slide to the engaged position 46. Once the legs 20 have been slid into the engaged position 46, the dial 56 is rotated counterclockwise to lock the legs 20 in the engaged position 46. The fully assembled 32 frame 30, with each of the members 12, 14, and 18 in the compressed position 42 and the plurality of legs 20 engaged 46, is shown in FIG. 3. In FIGS. 1 and 8, the elongate members 12, 14, and 18 of the assembled 32 frame 30 have been fully extended 40 by the quick release flip locks 24, and the retractable cable reels 80 have been strung both vertically and horizontally from the elongate members 12, 14, 18. Though the members 12, 14, and 18 of the portable display system 10 are only shown in the figures as fully compressed 42 or fully extended 40, the portable display system 10 is fully functional in a number of orientations with two or more of the elongate members 12, 14, and 18 compressed, partially extended, or fully extended as desired by the user.

Figure 12:
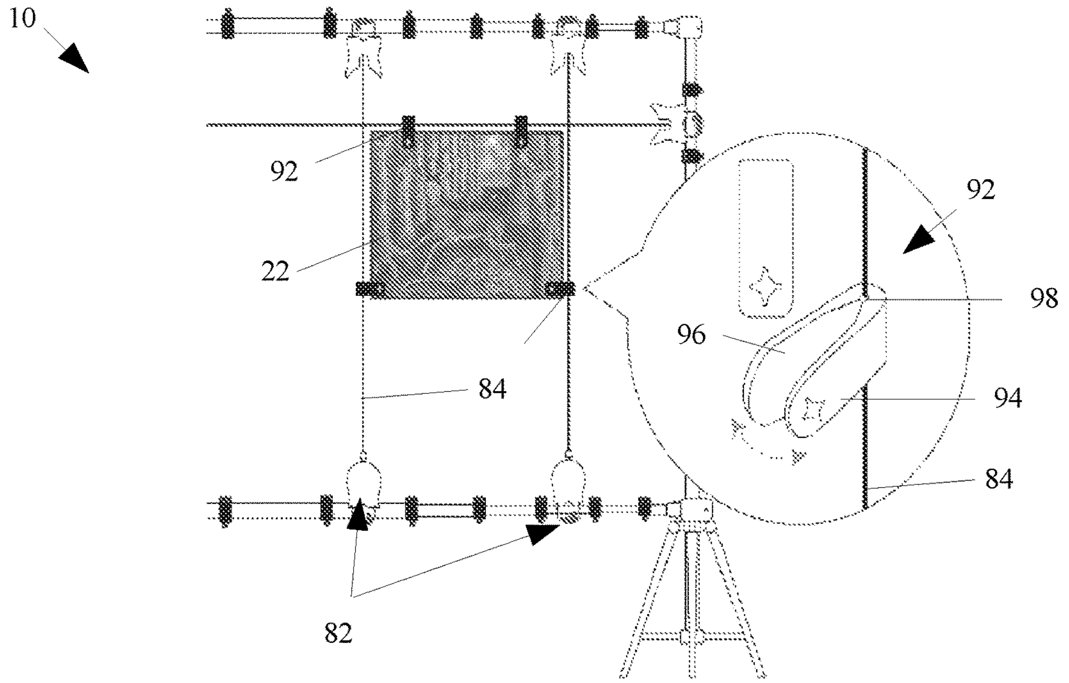
FIG. 12 is an enlarged view of the butterfly clip attached to the tensile cables of the portable display system for lightweight artwork in accordance with the principles of the invention.

FIG. 12 shows an enlarged view of attaching the lightweight artwork 22 to the tensile cables 84 by the butterfly clips 92. To attach the butterfly clip 92 to the tensile cables 84, one can use their index finger and thumb to separate the magnetic ends 94 and 96 of the clip 92 and close the clip 92 once the tensile cable 84 has been secured in the slot 98 and the artwork 22 has been secured between the two magnetic ends 94 and 96.

Figure 13:
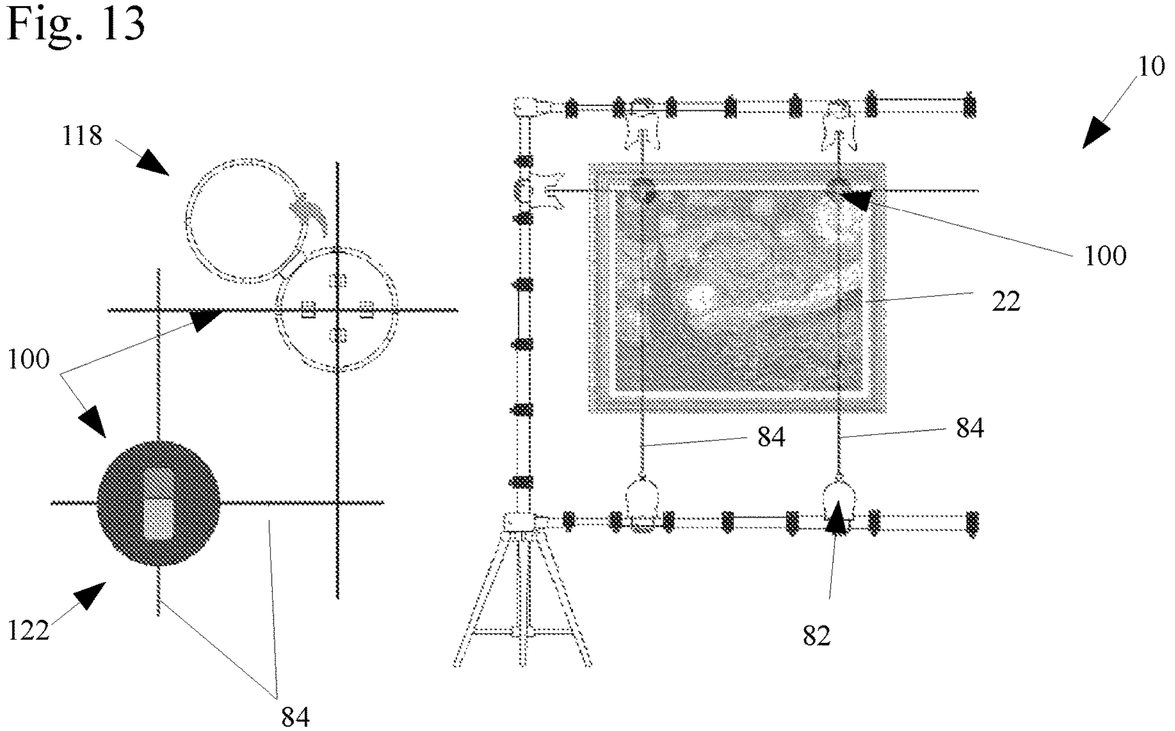
FIG. 13 is an enlarged view of the hanging clip attached to the tensile cables of the portable display system for lightweight artwork in accordance with the principles of the invention.

FIG. 13 shows an enlarged view of a hanging clip 100 attaching to the tensile cables 84 and hanging an item of lightweight artwork 22. To attach the hanging clip 100 to the tensile cables 84, the user opens the hanging clip 100 by applying a rotational force to the front disc 102 and the back disc 104 of the hanging clip 100 at a location opposite to the hinge 110. This will allow the front disc 102 of the hanging clip 100 to rotate around the hinge 110, leaving the hanging clip 100 in the open position 118. The user guides the horizontal tensile cable 84 through the horizontal openings 114 and the vertical tensile cable 84 through the vertical openings 112, and secures both cables 84 into the four pressure fit snap locks 116. Finally, to secure the hanging clip 100 to the cables 84, a user rotates the front disc 102 of the hanging clip 100 around the hinge 110 and applies a compression force to the front disc 102 of the hanging clip 100 to lock in the closed position 122. To remove the hanging clip 100 from the tensile cables 84, the user opens the hanging clip 100 by applying a rotational force to the front disc 102 and the back disc 104 of the hanging clip 100 at a location opposite to the hinge 110. This will allow the front disc 102 of the hanging clip 100 to rotate around the hinge 110, leaving the hanging clip 100 in the open position 118. The user then removes the cables 84 from the four pressure fit snap locks 116 and removes the hanging clip 100 from the tensile cables 84. The user then rotates the front disc 102 of the hanging clip 100 around the hinge 110 and applies a compression force to the front disc 102 of the hanging clip 100 to lock in the closed position 122 and can set aside for future use.

FIGS. 14-25 show an alternative embodiment of the portable display system 510, in accordance with the principles of the invention. The collapsible frame 518 consists of an elongate base member 518, an elongate top crossbar member 512, two elongate vertical members 514, and a pair of tripods 520 installed on each of the vertical members 114. The elongate members 512, 514, and 518 of the frame 530 are formed from telescopic round tubing. The elongate base member 518 and the elongate top crossbar member 512 include multiple flip locks 522 on both ends, and the two elongate vertical members 514 include one set of flip locks 522. Both of the elongate vertical members 514 include an upper extension 526 and a lower extension 516. The upper and lower extensions 526 and 516 lie on the same side of elongate vertical members 514, and the upper extension 526 is coplanar to the lower extension 516. The flip locks 522 are used to adjust the length of all the elongate members 512, 514, and 518, and are also used to secure the ends of the elongate top crossbar member 512 and the elongate base member 518 to the upper and lower extensions 526 and 516 on the elongate vertical members 514.

Figure 14:
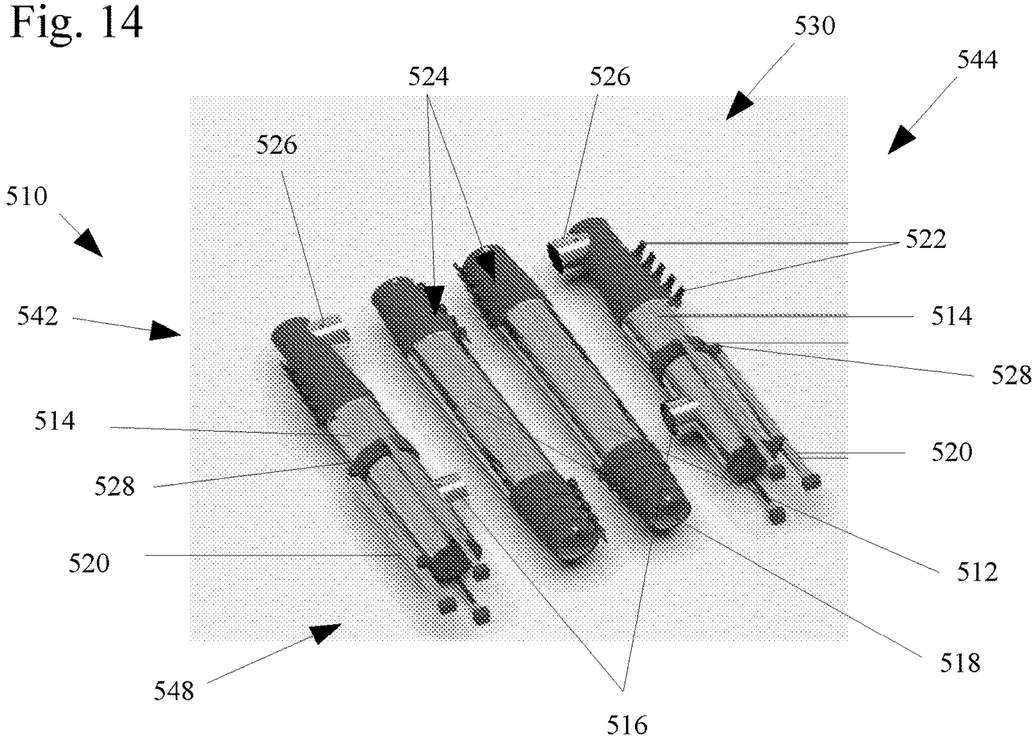
FIG. 14 is a perspective view of an alternative embodiment of a portable display system for lightweight artwork in the disassembled position with all the members in the compact position in accordance with the principles of the invention.

FIG. 14 shows the frame 530 of the portable display system 510 in a fully collapsed position 542, with the tripods 520 in the inactive position 548, and the elongate members 512, 514, and 518 in the most compact form 544.

Figure 15:
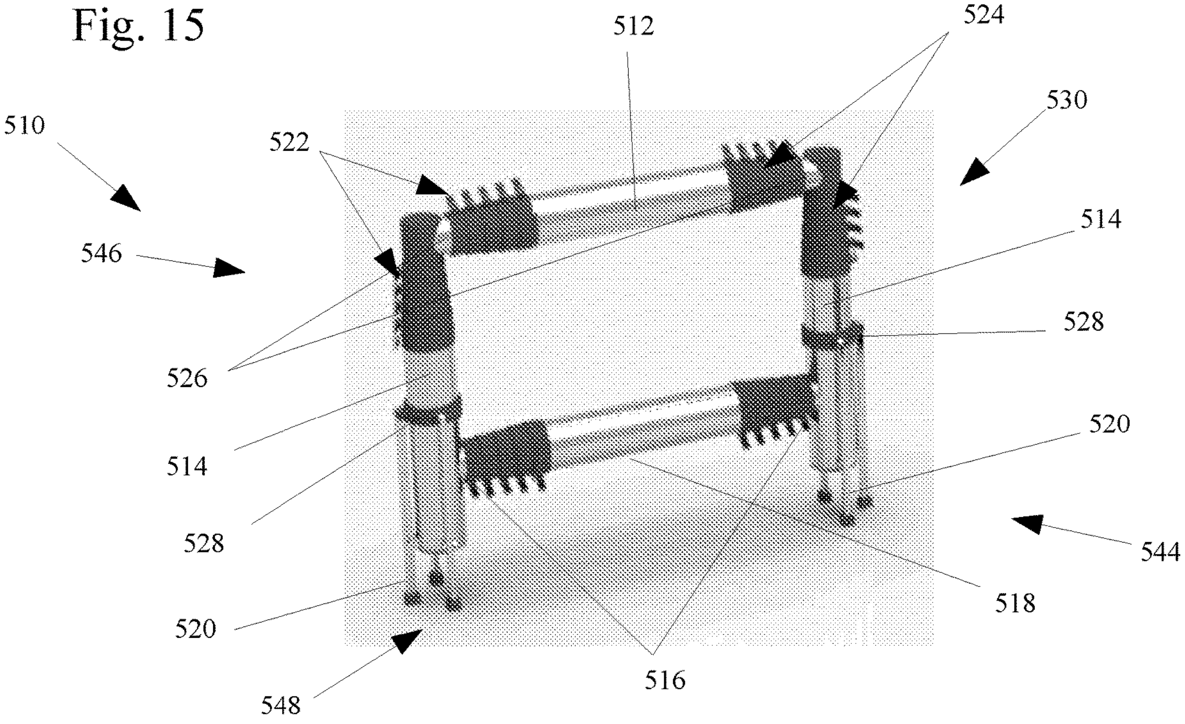
FIG. 15 is a perspective view of a portable display system for lightweight artwork in the assembled position with all the members in the compact position in accordance with the principles of the invention.

FIG. 15 shows a perspective view of the portable display system 510 in the fully assembled position 546. When assembled 546, the elongate top crossbar member 512 is attached to the upper extensions 526 of the elongate vertical members 514, and the elongate base member 518 is attached to the lower extensions 516 of the vertical members 514. Each elongate member 512, 514, and 518 of the frame 530 is in the most compact form 544, and the tripods 520 are in the inactive position 548.

Figure 16:
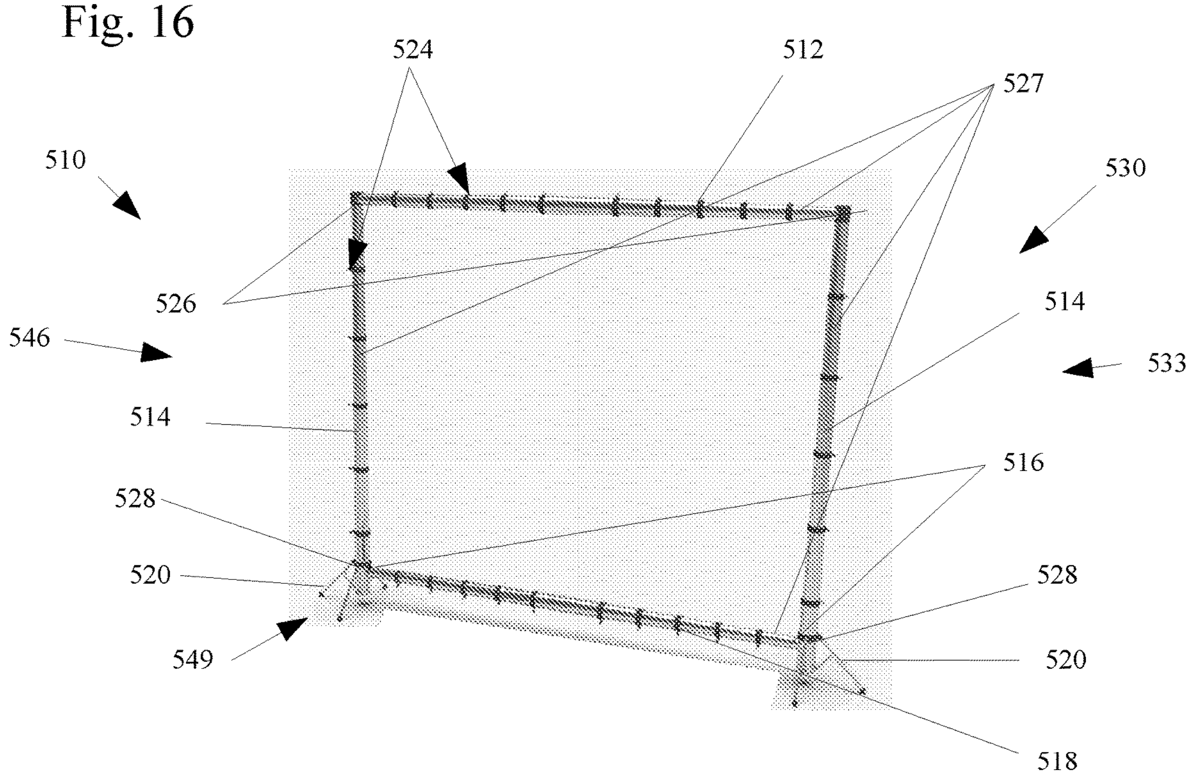
FIG. 16 is a perspective view of a portable display system for lightweight artwork in the assembled position with all the members in the extended position in accordance with the principles of the invention.

FIG. 16 shows a perspective view of the frame 530 of the portable display system 510 in the fully assembled position 546, with the tripods 520 in the active position 549, and each elongate member 512, 514, and 518 of the frame in the most extended form 533. In this Figure, the sliders 528 on the elongate vertical members 514 have been pushed downward to position the pair of tripods 520 in the active position 549, and the flip locks 522 have been used to lengthen each elongate member 512, 514, and 518. To extend each elongate member 512, 514, and 518, the flip lock 522 should be unlocked, the inner tube 527 should be drawn out until at one of the predetermined setpoints, and the flip lock 522 should be locked again. This should be repeated on each flip lock 522, and each elongate member 512, 514, and 518, to fully extend the portable display system 510. The flip lock 522 is explained in more detail in the paragraph below.

Figure 17:
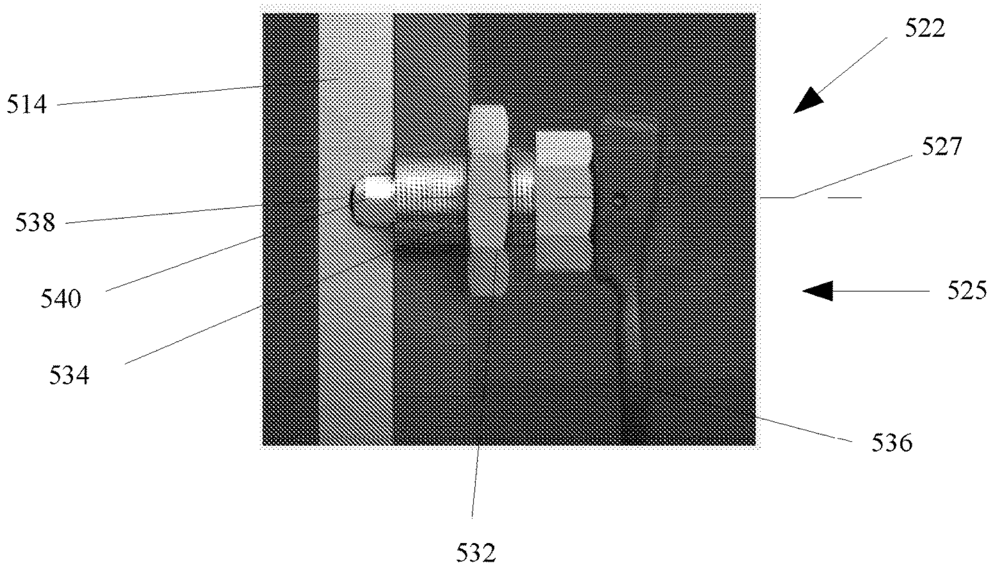
FIG. 17 is an enlarged view of the flip lock of the vertical members of the portable display system for lightweight artwork in accordance with the principles of the invention.

FIG. 17 shows an enlarged perspective view of the flip lock 522. As shown herein, the flip lock 522 is integrated into one of the elongate vertical members 514. The flip lock 522 consists of a handle 536, a bolt 534, a pin 540, and a nut 532. Each flip lock 522 included on the elongate member 514 designates an inner tube 527 of the elongate member 514. Each inner tube 527 of the elongate members 514 includes at least two pin slots 538. Though some may include more. The pin slots 538 should be located along the inner tube 527 to allow the member 514 to be locked in the compact form 544 and in the most extended form 533. To operate the flip lock 522, the handle 536 is rotated counterclockwise about the center 527 of the bolt 534 from the locked position 525 into an unlocked position where the handle 536 is parallel to the bolt 534. When the handle is rotated out of the locked position 525, the pin 540 is lifted out of one of the pin slots 538, allowing one of the inner tubes 527 of the elongate vertical member 514 to be drawn out. Once the member 514 has been extended and the pin 540 has been aligned with one of the pin slots 538, the handle 536 can be rotated clockwise about the center 527 of the bolt 534 down into the locked position. This pushes the pin 540 into the pin slot 538 and secures the member 514 in its extended position 533. Those having ordinary skill in the art would appreciate that this concept applies to each flip lock 522 installed on each elongate member 512, 514, and 518 of the portable display system 510.

Figure 18:
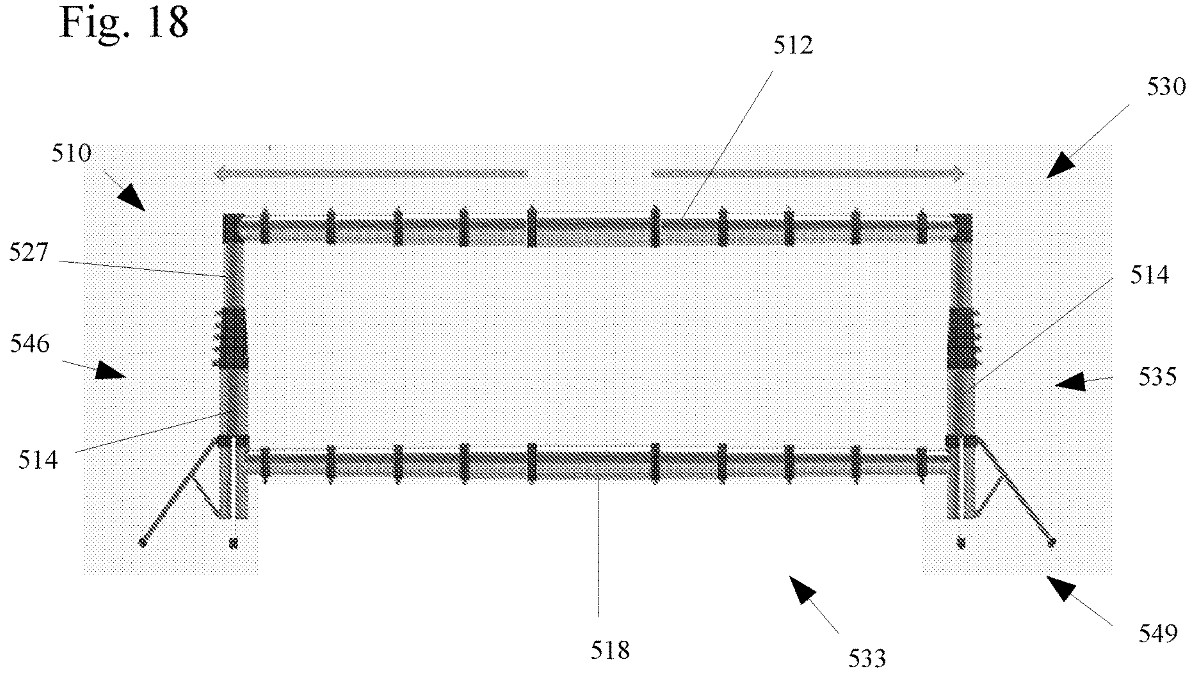
FIG. 18 is a front elevation view of the portable display system for lightweight artwork with the top crossbar and base member in the extended position in accordance with the principles of the invention.

FIG. 18 shows a front elevation view of the portable display system 510. In this Figure, the frame 530 of the portable display system 510 is fully assembled 546, the elongate top crossbar member 512 and the elongate base member 518 are fully extended 533, and the elongate vertical members 514 are partially extended 535. As demonstrated by FIGS. 18, the portable display system 510 is fully functional in a number of orientations with two or more of the elongate members 512, 514, and 518 compressed, partially extended, or fully extended as desired by the user.

Figure 19:
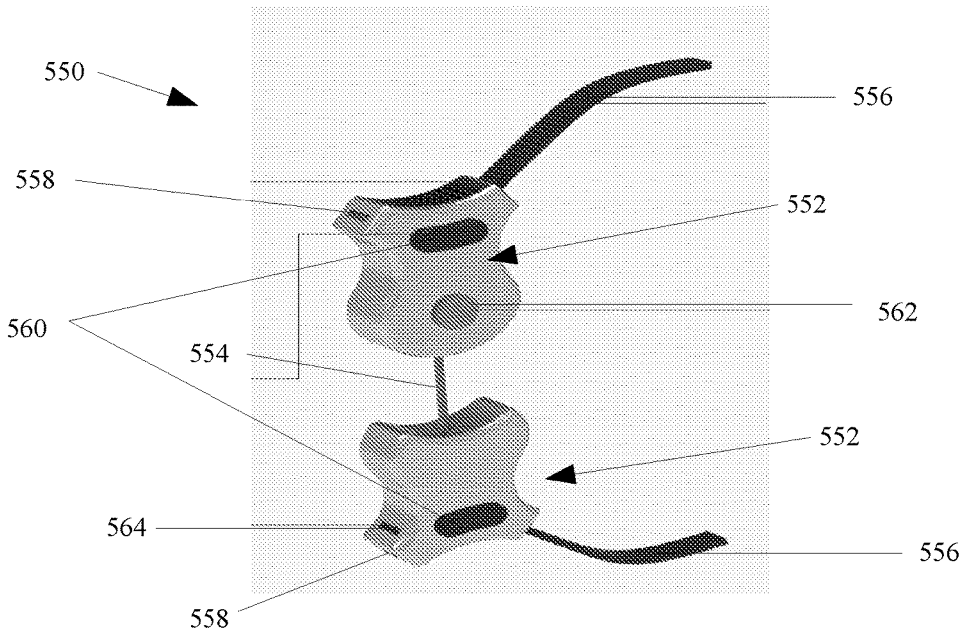
FIG. 19 is a perspective view of the retractable cable reel of the portable display system for lightweight artwork in accordance with the principles of the invention.

FIG. 19 shows an enlarged view of the retractable cable reel 550 used to hang lightweight artwork 566 from the frame 530 of the portable display system 510. In the embodiment, the retractable cable reel consists of two clamps 552 that are connected with a single tensile cable 554. Each clamp 552 has a rubber belt 556 to attach and secure the retractable cable reel 550 to the elongate members 512, 514, and 518 of the frame 530. Both clamps 552 also have inlet slots 558 and outlet slots 564 to insert the end of the belt 556, outlet slots 564 to tighten the belt 556 to one of the elongate members 512, 514, and 518, and a release lock 560 to release the rubber belt 556. In this embodiment, only one of the two clamps 552 has an integrated internal retractable cable mechanism and a cable release button 562 to extend or decrease the length of the tensile cable 554. However, this should not be considered limiting as both clamps may include this mechanism. Furthermore, though a retractable cable mechanism is used in this embodiment, one or both of the clamps 552 may include an integrated ratchet locking system instead. This would prevent the tensile cable 554 from further extension or retraction once at a desired length.

Figure 20:
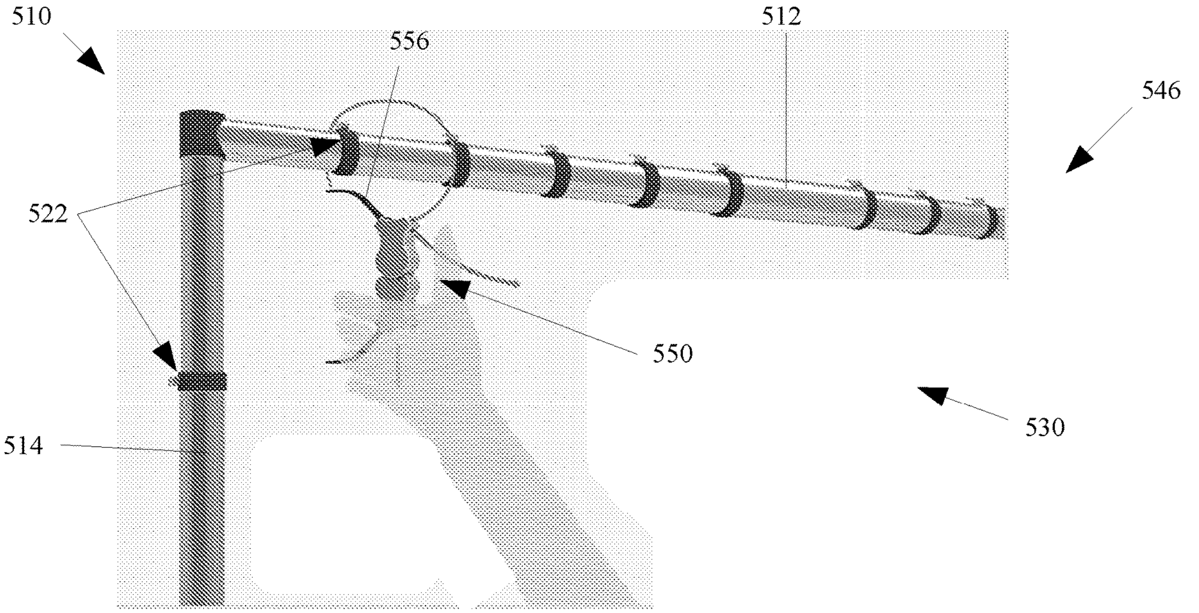
FIG. 20 is an enlarged view of the retractable cable reel of the portable display system for lightweight artwork in accordance with the principles of the invention.
Figure 21:
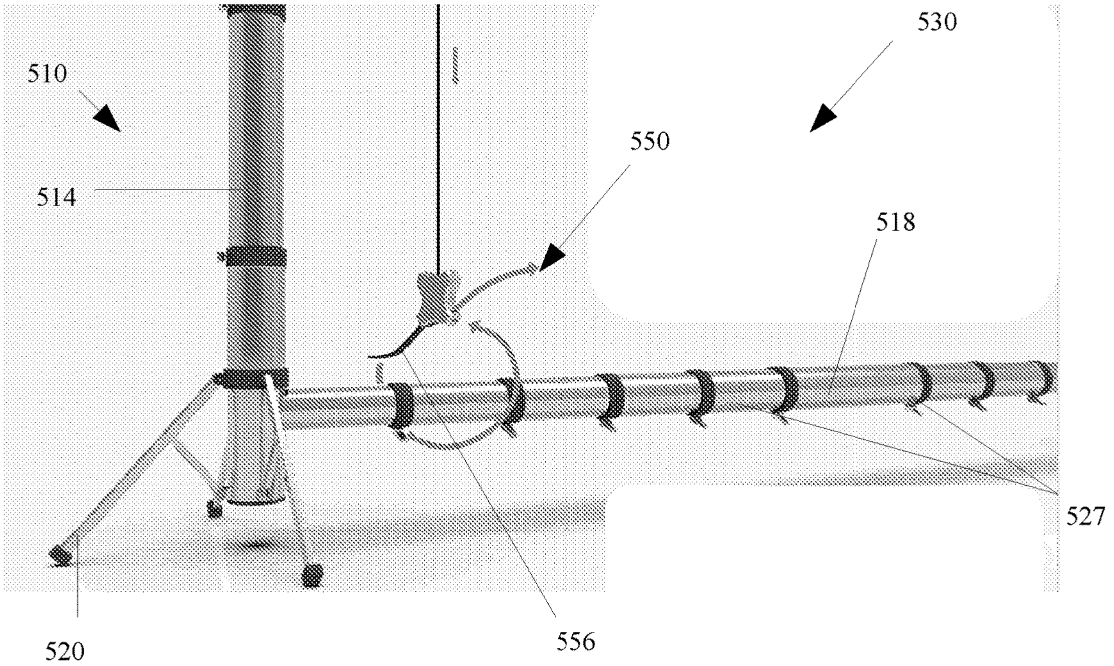
FIG. 21 is another enlarged view of the retractable cable reel of the portable display system for lightweight artwork in accordance with the principles of the invention.

FIGS. 20 and 21 show an enlarged perspective view of the retractable cable reel 550 being vertically strung from the elongate top crossbar member 512 to the elongate base member 518. To attach, the rubber belt 556 of one of the clamps 552 is looped around the elongate top crossbar member 514, inserted into the inlet slot 558, and through the outlet slot 564. One can then pull the rubber belt 556 tight to secure and lock the clamp 552 in place. Once the clamp 552 is secured to the elongate top crossbar member 514, the cable release button 562 is depressed, allowing the tensile cable 554 to unwind from inside the clamp 552, and the clamp is pulled down to the elongate base member 518. Once the clamp 552 has reached the elongate base member 518, one can then loop the rubber belt 556 of the clamp 552 around the elongate base member 518, insert into the inlet slot 558, through the outlet slot 564, and pull to tighten. The rubber belt 556 provides an advantage to other hanging methods, because the inner tubes 527 of each member 512, 514, and 518 have different circumferences. Since the rubber belt 556 can be pulled through the slots 558 and 564 as little or as much as possible, the user can ensure that the clamps 552 of the retractable cable reel 550 are securely fastened to the member 512, 514, and 518.

To disassemble, a user presses the release lock 560 on one of the clamps 552 to release the rubber belt 556 from the elongate base member 518. The cable release button 562 on the clamp 552 is depressed to retract and rewind the tensile cable 554 back into the clamp 552. Once one of the clamps 552 has reached the clamp 552 attached to the elongate top crossbar member 512, the user can press the release lock 560 on the clamp 552 to undo the rubber belt 556 and remove the retractable cable reel 550 from the portable display system 510.

Figure 22:
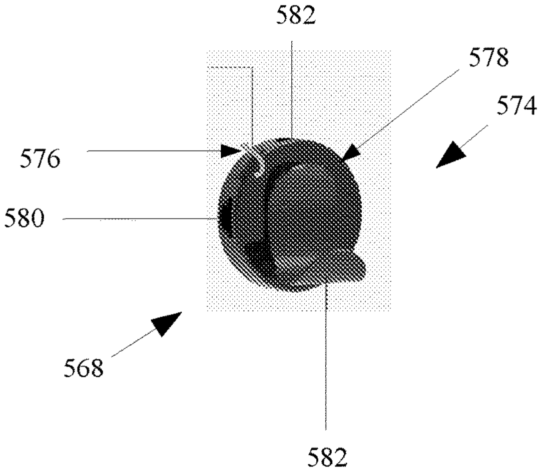
FIG. 22 is a perspective view of the hanging clip in the locked position of the portable display system for lightweight artwork in accordance with the principles of the invention.
Figure 23:
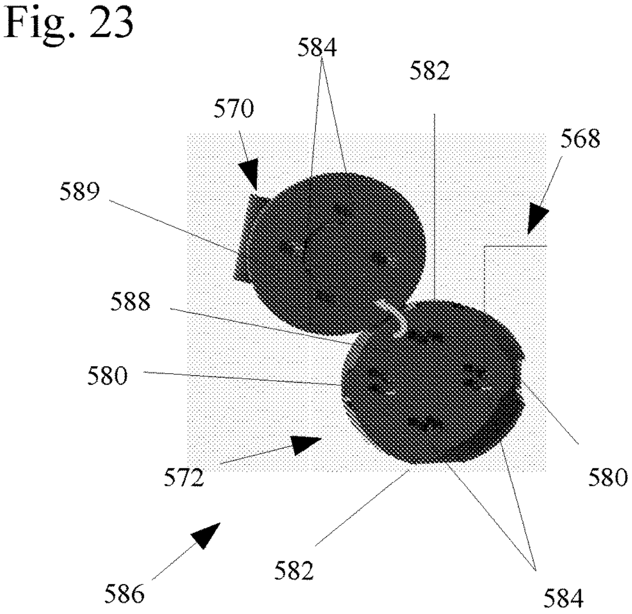
FIG. 23 is a perspective view of the hanging clip in the open position of the portable display system for lightweight artwork in accordance with the principles of the invention.

FIGS. 22 and 23 show the hanging clip 568 used to hang lightweight artwork 566 from the tensile cables 554 of the portable display system 510. As shown, the hanging clip 568 consists of a front disc 570 having a hook 574 on the outside surface 578, a back disc 572, a hinge 576, horizontal openings 580 on the left and right of the hanging clip 568, vertical openings 582 on the top and bottom of the hanging clip 568, and four pressure fit snap locks 584 on the inside surface 588 of the back disc 572 and the inside surface 589 of the front disc 570 to hold the tensile cables 554 in a fixed vertical and horizontal position.

Figure 24:
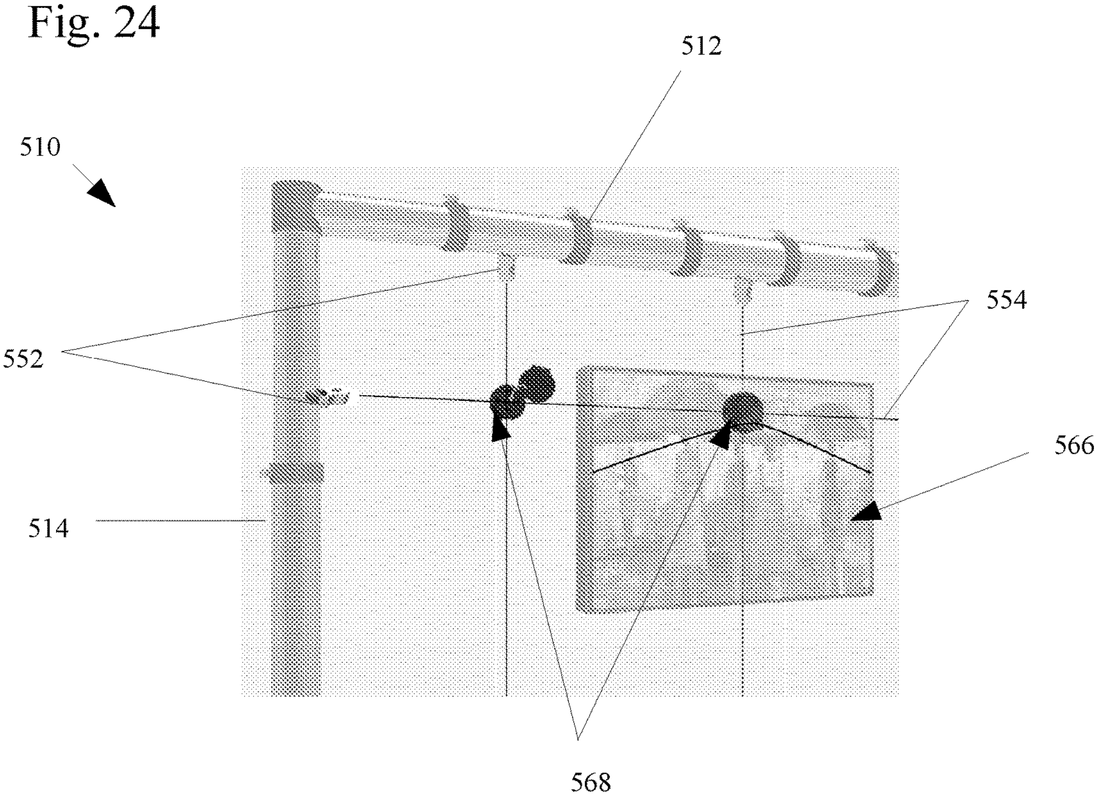
FIG. 24 is an enlarged view of the hanging clip of the portable display system for lightweight artwork in accordance with the principles of the invention.

FIG. 24 shows an enlarged perspective view of a hanging clip 568 attaching to the tensile cables 554 and hanging an item of lightweight artwork 566. To attach the hanging clip 568 to the tensile cables 554, the user opens the hanging clip 568 by applying a rotational force to the front disc 570 and the back disc 572 of the hanging clip 568 at a location opposite to the hinge 576. This will allow the front disc 570 of the hanging clip 568 to rotate around the hinge 576, leaving the hanging clip 568 in the open position 586. The user guides the horizontal tensile cable 554 through the horizontal openings 580 and the vertical tensile cable 554 through the vertical openings 582 and secures both cables 554 into the four pressure fit snap locks 584. Finally, to secure the hanging clip 568 to the cables 554, a user rotates the front disc 570 of the hanging clip 568 around the hinge 576 and applies a compression force to the front disc 570 of the hanging clip 568 to lock in the closed position 578.

Figure 25:
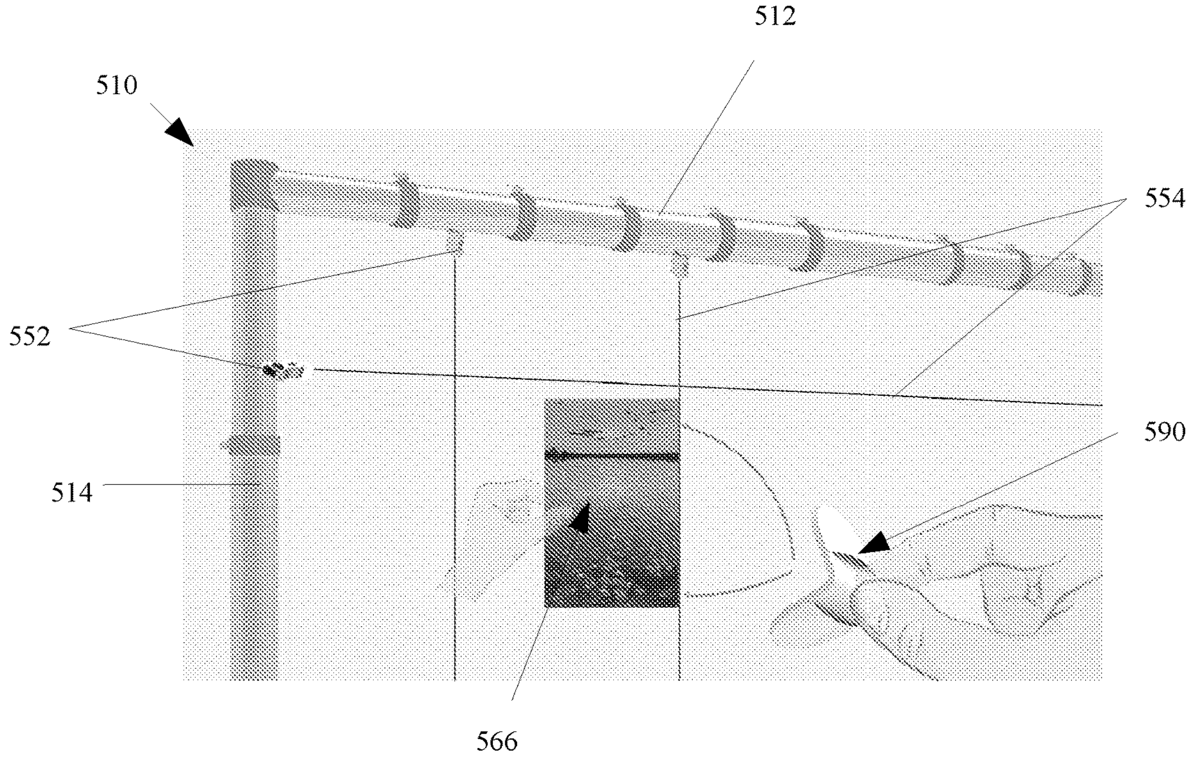
FIG. 25 is an enlarged view of the magnetic clip of the portable display system for lightweight artwork in accordance with the principles of the invention.

FIG. 25 shows an enlarged perspective view of the magnetic clips 590 used to hang lightweight artwork 566 from the tensile cables 554 of the portable display system 510. The magnetic clips 590 have a magnet on the inside of both ends. To attach the magnetic clip 590 to the tensile cables 566, an operator can use their index finger and thumb to separate both sides of the magnet and reattach the ends of the clip 590 once the artwork 566 has been secured around the tensile cables 554.

Figure 26:
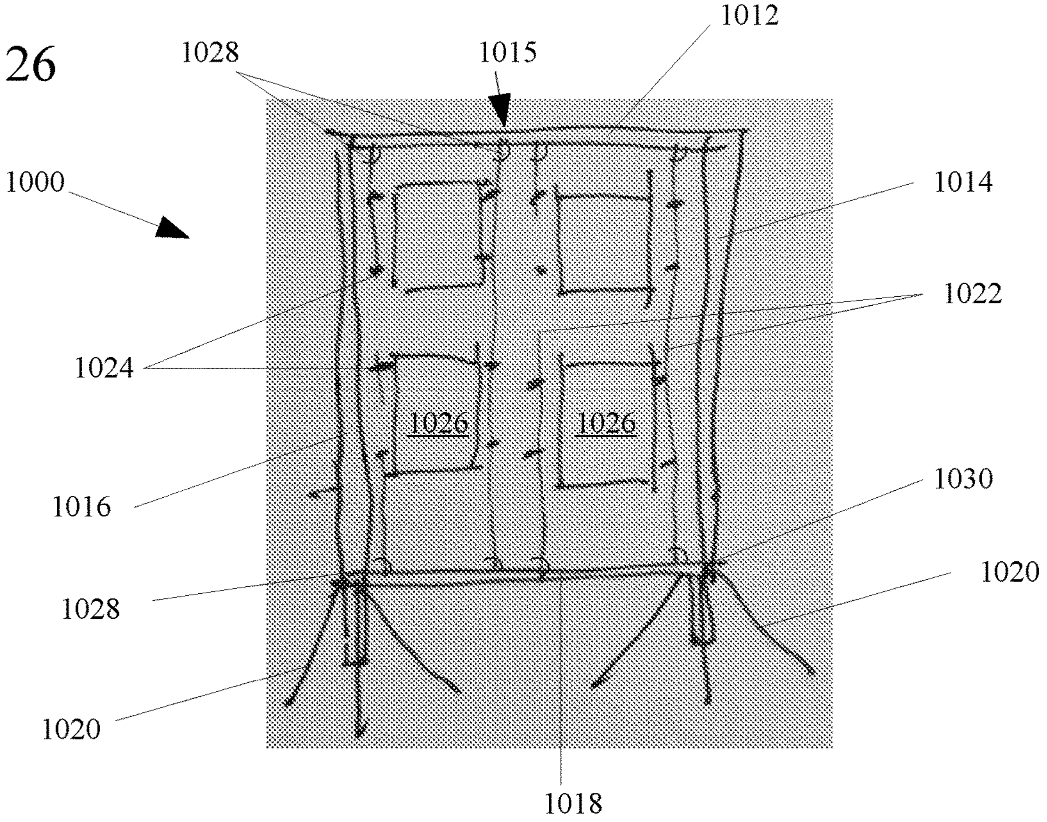
FIG. 26 is a front elevation view of an alternative embodiment of a portable display system for lightweight artwork in accordance with the principles of the invention.
Figure 27:
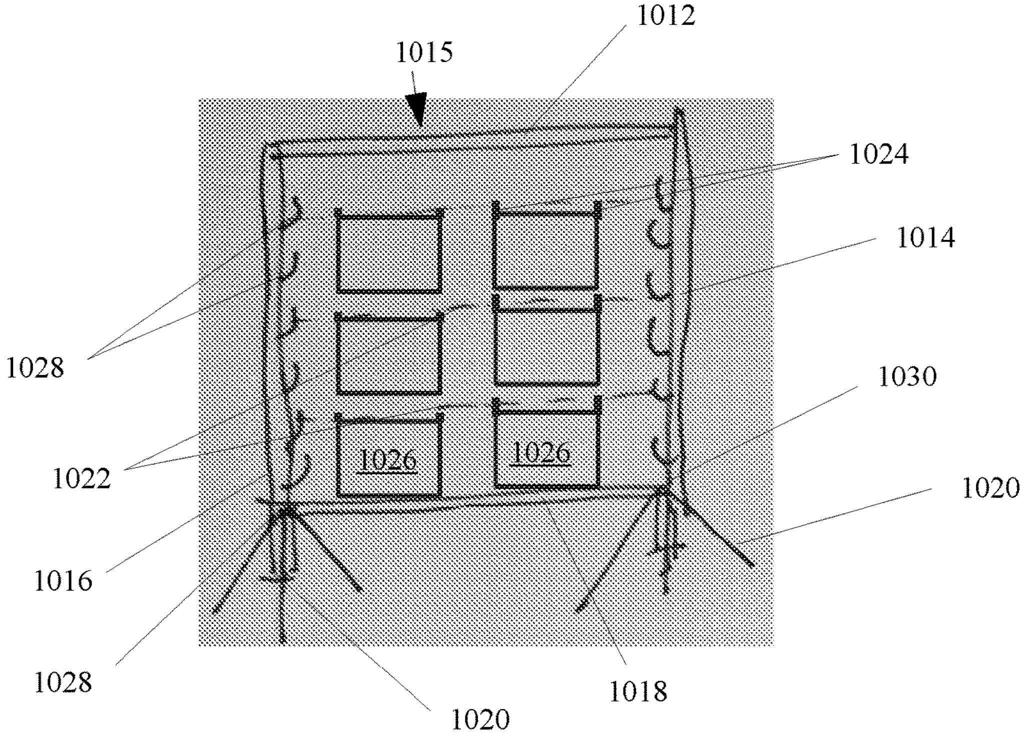
FIG. 27 is another front elevation view of a portable display system for lightweight artwork in accordance with the principles of the invention.
Figure 28:
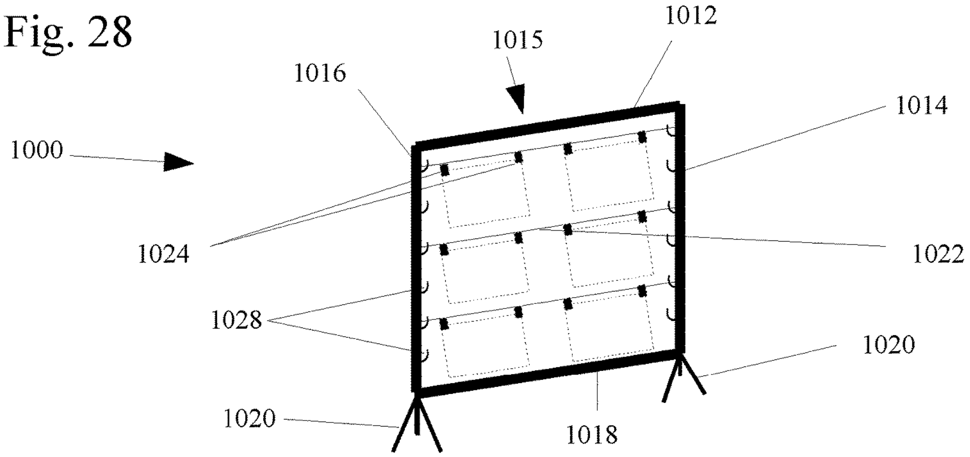
FIG. 28 is a perspective view of a portable display system for lightweight artwork in accordance with the principles of the invention.

FIGS. 26-28 show an embodiment of a portable display system 1000, in accordance with the principles of the invention. The portable display system 1000 consists of a collapsible frame 1015 having a plurality of legs 1020 extending downward from either end of the frame 1015. The collapsible frame 1015 is comprised of an elongate base member 1018, a first elongate vertical member 1014 attached on the first end 1030 of the elongate base member 1018, an opposing second elongate vertical member 1016 attached on the second end 1028 of the elongate base member 1018, and an elongate top crossbar member 1012 extending between the first elongate vertical member 1014 and the second elongate vertical member 1016. In this embodiment, a group of three legs 1020 is attached to and extends downward from each end 1028 and 1030 of the elongate base member 1018. Those having ordinary skill in the art would appreciate that the plurality of legs 1020 extending downward from each end 1028 and 1030 may be defined by as little as two legs or any number of legs as desired. Additionally, the plurality of legs 1020 may optionally be attached to the elongate vertical members as in other embodiments. The group of three legs 1020 ensures that the portable display system 1000 is not only sturdy, but that it is lightweight and easy to move. The elongate base member 1018 extends horizontally between the first elongate vertical member 1014 and the second elongate vertical member 1016. In this embodiment, the elongate top crossbar member 1012 is horizontal and substantially parallel to the elongate base member 1018. Additionally, the elongate top crossbar member 1012 and the elongate base member 1018 are perpendicular with the first and second elongate vertical members 1014 and 1016, and the elongate top crossbar member 1012 is coextensive with the elongate base member 1018. The first and second elongate vertical members 1014 and 1016 are coextensive and parallel.

As shown herein, all members of the frame have a square cross-section. Both sets of three legs 1020 support the frame 1015, and the legs 1020 are further collapsible. Those having ordinary skill in the art would appreciate that this system is like the tripod mounting system used for cameras and telescopes. Optionally, the plurality of legs 1020 may be more than three legs but should preferably be more than two. As shown in FIG. 26, the tensile cables 1022 are strung vertically and are attached by fasteners 1028 to the inside surface of the elongate top crossbar member 1012 and the elongate base member 1018. The tensile cables 1022 may also be strung horizontally, as shown in FIGS. 27 and 28 which show the portable display system 30 with the tensile cables strung horizontally 1022. Additionally, those skilled in the art will appreciate that this embodiment can be combined with the embodiment shown in FIG. 26, so one can have a combination of vertically strung tensile cables 1022 and ones that are horizontally strung. The tensile cables 1022 used herein are thin woven wire cables. The tensile cables 1022 may be made from material with high tensile strength and ductility such as galvanized steel, stainless steel, nylon, or the like. Additional fasteners 1028 can be added or removed as desired to allow for more lightweight artwork 1026 to be hung. The fasteners 1028 may be made from plastic, metal, aluminum, steel, or the like, and may resemble the appearance and shape of a carabiner, lockable fastener, a link, buckle, snap fit, bayonet lock, or the like. The lightweight artwork 1026 can be easily attached to the tensile cables 1022 by clips 1024, such as clothes pins, poster clips, tape, magnetic clip, or the like.

Figure 29:
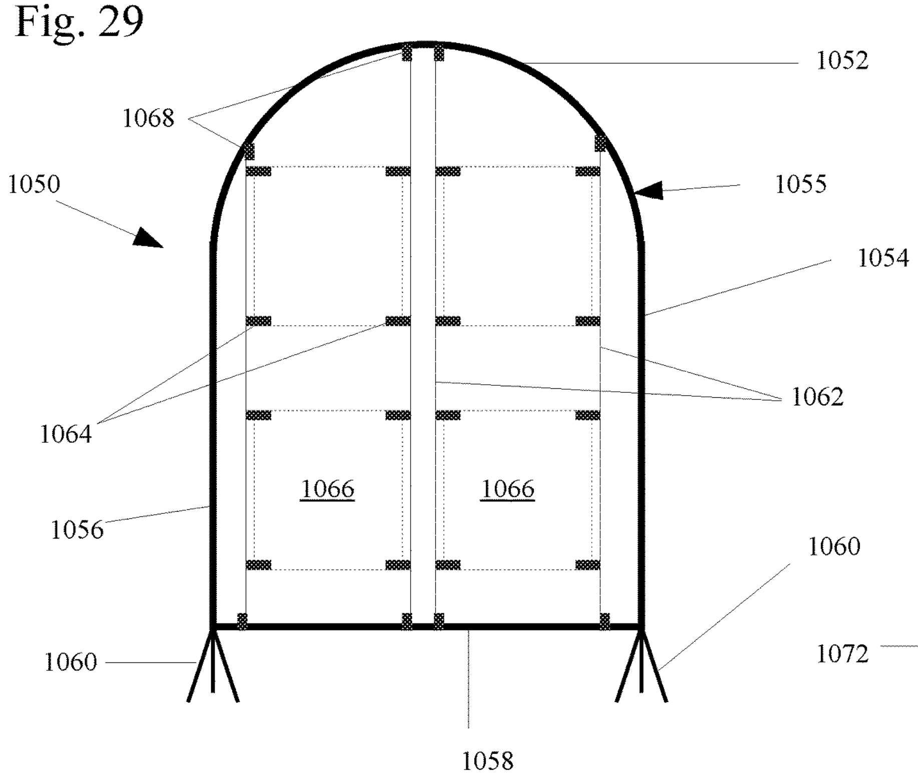
FIG. 29 is a front elevation view of an alternative embodiment of a portable display system for lightweight artwork in accordance with the principles of the invention.

FIG. 29 shows an alternative embodiment of the portable display system 1050, in accordance with the principles of the invention. As shown in this embodiment, the elongate top crossbar member 1052, which extends from the first elongate vertical member 1054 and the second elongate vertical member 1056, is flexible and can bend at an angle designated by the user. In this embodiment, the tensile cables 1062 are strung vertically and attached to the fasteners 1068, which have been installed on the top crossbar 1052 and the base member 1058. As shown in this embodiment, the fasteners 1068 used to secure the tensile cables 1062 to the base member 1058 are bayonet locks. This is further shown in FIG. 30. As in the other embodiments, the lightweight artwork 1066 has been hung on the tensile cables 1062 with clips 1064, and a plurality of legs 1060 extend from the frame 1055. Though a pair of tripods 1060 are shown in this embodiment, those having ordinary skill in the art would appreciate that any number of legs may be used to support the base.

Figure 30:
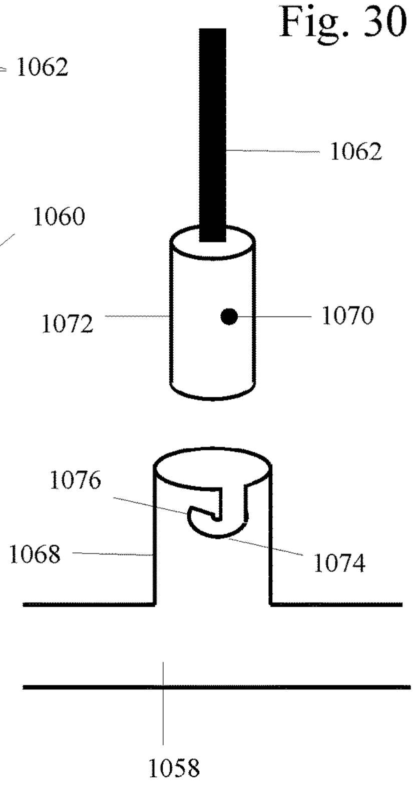
FIG. 30 is an enlarged front view of a fastener of a portable display system for lightweight artwork in accordance with the principles of the invention.

FIG. 30 shows an enlarged view of the fastener 1068 used in the embodiment of the portable display system 1050 in FIG. 29. As shown, the fastener 1068 used in this embodiment is a bayonet lock. An automatically locking bayonet lock includes: a guide structure to prevent rotation between the sleeve 1072 and the fastener 1068, a sleeve 1072 mounted on the tensile cable 1062, a spring mounted inside the sleeve 1072 which is used to generate a torsional force, a J-shaped groove 1074 on the fastener 1068, and a bayonet pin 1070 extending from the surface of the sleeve 1072. As the sleeve 1072 and the fastener 1068 are pushed together, engagement between the bayonet pin 1070 and the I-shaped groove 1074 causes the sleeve 1072 to rotate against the force of the spring. As the sleeve 1072 is caused to rotate into the locked position 1076 in response to the spring force, the angle of the I-shaped groove 1074 causes a spring force on the bayonet pin 1070 which draws the sleeve 1072 and the fastener 1068 together, and holds the pin 1070 in the final, locked position 1076.

Figure 31:
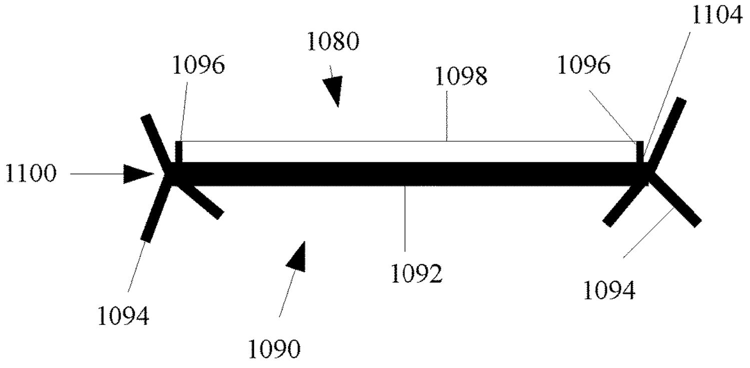
FIG. 31 is a top view of an alternative embodiment of a portable display system for lightweight artwork in accordance with the principles of the invention.

FIG. 31 shows a top view of an alternative embodiment of the portable display system 1080, in accordance with the principles of the invention. As shown, the top crossbar 1092 runs horizontally, as in other embodiments. The pair of tripods 1094 are mounted to the frame 1090. Finally, fasteners 1096 have been mounted to the front side 1104 of the vertical members 1100, and tensile cables 1098 have been strung horizontally from the fasteners 1096. The fasteners 1096 may optionally be located on the interior sides of the frame.

Figure 32:
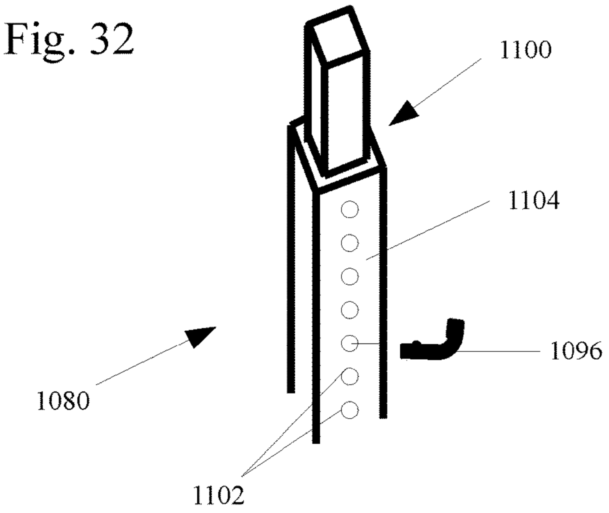
FIG. 32 is a perspective view of one of the vertical members of the portable display system for lightweight artwork in accordance with the principles of the invention.

FIG. 32 shows a perspective view of one of the vertical members 1100 of the portable display system 1080, in accordance with the principles of the invention. As shown in this embodiment, the member has a square cross-section, and the front side 1104 of the member 1100 includes multiple, circular openings 1102 in which the fasteners 1096 can be removably affixed. Additionally, as shown in this embodiment, the member can telescopically extend and retract. For example, this would allow the user to extend or retract the member 1100 from three feet to four feet to five feet long, or to any designed lengths.

Figure 33:
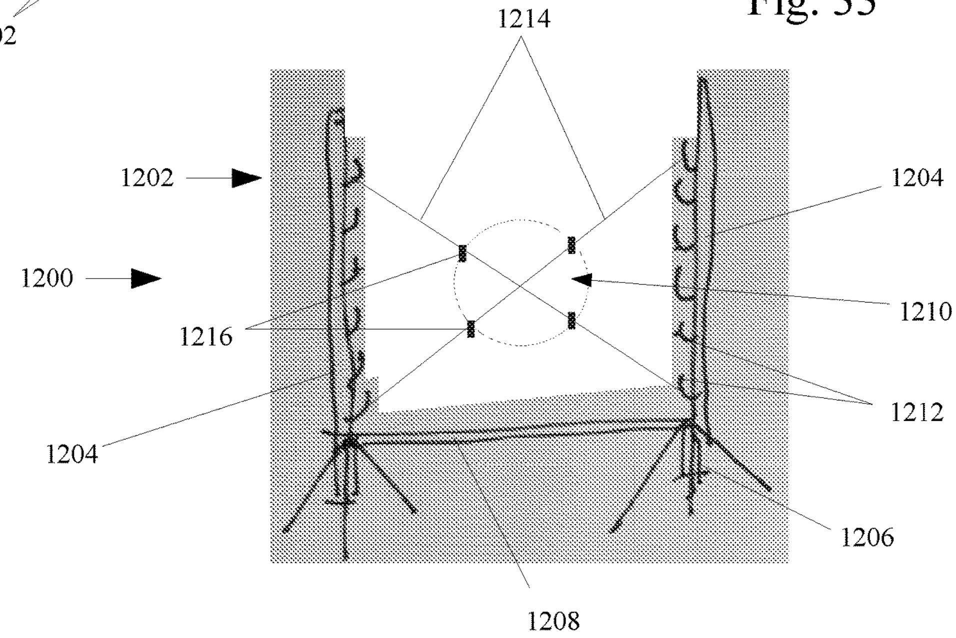
FIG. 33 is a front elevation view of an alternative embodiment of a portable display system for lightweight artwork in accordance with the principles of the invention.

FIG. 33 shows a front view of an alternative embodiment of the portable display system 1200, in accordance with the principles of the invention. The portable display system 1200 consists of a collapsible frame 1202 having a plurality of legs 1206 extending downward from either end of the frame 1202. In this embodiment, the collapsible frame 1202 is U-shaped and is comprised of three members: an elongate base member 1208 and two vertical member 1204 attached on either end of the elongate base member 1208. Tensile cables 1214 have been attached to fasteners 1212 and strung diagonally between the two vertical members 1204. This may be useful for the case where the user wishes to display different shaped objects that are more aesthetically displayed on diagonal cables. It also may give the portable display system an artistic appeal that is unachievable with vertical or horizontal cables. Lightweight artwork 1210 has been removably attached to the diagonal tensile cables 1214 by clips 2016. Skilled artisans would appreciate that the tensile cables may be strung diagonally in the other embodiments where the frame is comprised of four elongate members.

In use, all the exemplary embodiments shown will show lightweight artwork on a portable display system. That is, the complete system comprises a collapsible frame, a tripod mounting system attached to the frame, tensile cables strung vertically or horizontally, and a means by which to temporarily hang lightweight artwork, paintings, or framed pictures. Additionally, one skilled in the art will appreciate that this system is not limited to lightweight artwork alone, but that it could be used to showcase framed artwork, banners, advertisements, exhibition visuals, and other temporary visual displays at schools, exhibitions, and conferences, or the like to allow artists to efficiently setup and show their artwork, without having to worry about the display being unstable or unnecessarily heavy.

Whereas, the present invention has been described in relation to the drawings attached hereto, other and further modifications, apart from those shown or suggested herein, may be made within the spirit and scope of this invention. Those skilled in the art will appreciate that the conception, upon which this disclosure is based, may readily be utilized as a basis for the designing of other structures, methods and systems for carrying out the several purposes of the present invention. Descriptions of the embodiments shown in the drawings should not be construed as limiting or defining the ordinary and plain meanings of the terms of the claims unless such is explicitly indicated. The claims should be regarded as including such equivalent constructions insofar as they do not depart from the spirit and scope of the present invention.

The invention claimed is:

1. A portable display system for lightweight artwork comprising:

a collapsible frame comprising an elongate base member having two ends;

two elongate vertical members, one extending from each of the two ends of the elongate base member;

an elongate top crossbar member extending between the two elongate vertical members;

a plurality of legs extending downward from each end of the elongate base member; and one or more tensile cables extending horizontally between the two elongate vertical members; wherein at least one item of lightweight artwork is removably attached to the one or more tensile cables; and, wherein one of the one or more tensile cables extends between two clamps; and wherein one of the clamps includes a retractable reel providing tension to one of the one or more tensile cables.

2. The portable display system for lightweight artwork of claim 1, wherein all elongate members of the collapsible frame have a circular cross-section.

3. The portable display system for lightweight artwork of claim 2, wherein all elongate members of the collapsible frame telescopically extend and retract.

4. The portable display system for lightweight artwork of claim 3, wherein each of the plurality of legs extending downward from the two ends of the elongate base member are each connected to one of the two elongate vertical members.

5. The portable display system for lightweight artwork of claim 4, wherein one or more tensile cables are strung vertically between the elongate top crossbar member and the elongate base member.

6. The portable display system for lightweight artwork of claim 5, wherein each of the two clamps comprises a flexible belt and slot having a locking mechanism opposite to the belt; wherein the clamp is removably attached to one of the elongate members by wrapping the belt around one of the elongate members and into the slot and engaging the locking mechanism; wherein the clamp is detached from the elongate member by disengaging the locking mechanism and removing the belt from the slot.

7. The portable display system for lightweight artwork of claim 5, wherein the two clamps include an integrated ratchet locking mechanism to prevent one of the one or more tensile cables from further extension or retraction once at a desired length.

8. The portable display system for lightweight artwork of claim 7, wherein one or more hanging clips removably attaches at least one item of lightweight artwork to at least one of the one or more tensile cables.

9. The portable display system for lightweight artwork of claim 8, wherein the hanging clips are comprised of a front disc and a back disc connected by a hinge, a hook on an outside surface of the front disc, horizontal openings on a left side and a right side of the front disc and back disc, vertical openings on a top side and a bottom side of the front disc and back disc, and four pressure fit snap locks on an inside surface of the back disc radially spaced about the center of the back disc, wherein the one or more tensile cables are held inside the pressure fit snap locks on the inside surface of the back disc to hold the hanging clips in a fixed vertical position and a fixed horizontal position on the one or more tensile cables.

10. The portable display system for lightweight artwork of claim 8, wherein one or more of the hanging clips are butterfly clips.

11. The portable display system for lightweight artwork of claim 10, wherein the butterfly clips are magnetic.

12. A portable display system for lightweight artwork comprising:

a collapsible frame comprising an elongate base member having two ends;

two elongate vertical members, one extending from each of the two ends of the elongate base member;

an elongate top crossbar member extending between the two elongate vertical members;

a plurality of legs extending downward and connected to each end of the elongate base member; and one or more tensile cables extending horizontally between the two elongate vertical members; wherein at least one item of lightweight artwork is removably attached to the one or more tensile cables;

wherein the one or more tensile cables are strung diagonally between the two elongate vertical members.

13. The portable display system for lightweight artwork of claim 12, wherein all members of the collapsible frame telescopically extend and retract.

14. A portable display system for lightweight artwork of claim 13, wherein a front side of the elongate members includes one or more circular openings; and wherein one or more fasteners may be removably secured into the one or more circular openings.

15. A portable display system for lightweight artwork of claim 14, wherein a top side of the elongate base member and a bottom side of the elongate top crossbar member includes one or more permanent fasteners.

16. The portable display system for lightweight artwork of claim 15, wherein the one or more tensile cables have firm loops on the ends that may be attached to the one or more fasteners.

17. The portable display system for lightweight artwork of claim 16, wherein one or more hanging clips removably attaches at least one item of lightweight artwork to at least one of the one or more tensile cables.

18. The portable display system for lightweight artwork of claim 17, wherein the hanging clips are magnetic.

* * * * *